United States Patent
Yamasaki et al.

(10) Patent No.: US 8,995,246 B2
(45) Date of Patent: Mar. 31, 2015

(54) OPTICAL HEAD, OBJECTIVE LENS, OPTICAL DISC DEVICE, COMPUTER, OPTICAL DISC PLAYER, AND OPTICAL DISC RECORDER

(71) Applicant: Panasonic Intellectual Property Management Co., Ltd., Osaka (JP)

(72) Inventors: Fumitomo Yamasaki, Nara (JP); Yoshiaki Komma, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/350,673

(22) PCT Filed: Aug. 5, 2013

(86) PCT No.: PCT/JP2013/004724
§ 371 (c)(1),
(2) Date: Apr. 9, 2014

(87) PCT Pub. No.: WO2014/024462
PCT Pub. Date: Feb. 13, 2014

(65) Prior Publication Data
US 2014/0269244 A1    Sep. 18, 2014

(30) Foreign Application Priority Data
Aug. 9, 2012 (JP) .................. 2012-176682

(51) Int. Cl.
*G11B 7/135* (2012.01)
*G11B 7/1353* (2012.01)
(Continued)

(52) U.S. Cl.
CPC ............. *G11B 7/1353* (2013.01); *G11B 7/085* (2013.01); *G11B 7/09* (2013.01); *G11B 7/135* (2013.01); *G02B 5/1876* (2013.01); *G11B 7/1374* (2013.01)
USPC ..................................................... 369/112.05

(58) Field of Classification Search
None
See application file for complete search history.

(56) References Cited

U.S. PATENT DOCUMENTS 5,446,565 A    8/1995    Komma et al.
2005/0168821 A1    8/2005    Ikenaka
(Continued)

FOREIGN PATENT DOCUMENTS

JP    7-98431    4/1995
(Continued)

OTHER PUBLICATIONS

International Search Report issued Sep. 17, 2013 in International (PCT) Application No. PCT/JP2013/004724.

*Primary Examiner* — Brenda Bernardi
(74) *Attorney, Agent, or Firm* — Wenderoth, Lind & Ponack, L.L.P.

(57) ABSTRACT

An objective lens (101) is configured to converge laser light of a first wavelength $\lambda 1$ (390 [nm]$\leq\lambda 1\leq$430 [nm]), laser light of a second wavelength $\lambda 2$ (630 [nm]$\leq\lambda 2\leq$680 [nm]), and laser light of a third wavelength $\lambda 3$ (750 [nm]$\leq\lambda 3\leq$810 [nm]) on an information recording surface of a first information recording medium, an information recording surface of a second information recording medium, and an information recording surface of a third information recording medium, and is configured such that the distance from a convergent point of normal diffracted order light, to a virtual collecting point formed by virtual diffracted order light between the convergent point of normal diffracted order light and a collecting point of unwanted diffracted order light is twice or more of the pull-in range of a focus error signal to be obtained in recording or reproducing information with respect to the third information recording medium.

9 Claims, 12 Drawing Sheets

(51) Int. Cl.
  *G11B 7/085* (2006.01)
  *G11B 7/09* (2006.01)
  *G02B 5/18* (2006.01)
  *G11B 7/1374* (2012.01)

(56) References Cited

U.S. PATENT DOCUMENTS

| | | |
|---|---|---|
| 2007/0070860 A1 | 3/2007 | Koreeda et al. |
| 2008/0192611 A1 | 8/2008 | Yamasaki et al. |
| 2010/0054109 A1 | 3/2010 | Yasui |
| 2011/0242950 A1 | 10/2011 | Komma et al. |
| 2012/0213052 A1* | 8/2012 | Yamasaki et al. ........ 369/112.05 |

FOREIGN PATENT DOCUMENTS

| | | |
|---|---|---|
| JP | 3661680 | 6/2005 |
| JP | 2005-216419 | 8/2005 |
| JP | 2007-122851 | 5/2007 |
| JP | 3993870 | 10/2007 |
| JP | 2010-55693 | 3/2010 |
| WO | 2008/069302 | 6/2008 |
| WO | 2009/016847 | 2/2009 |

* cited by examiner

OPTICAL HEAD, OBJECTIVE LENS, OPTICAL DISC DEVICE, COMPUTER, OPTICAL DISC PLAYER, AND OPTICAL DISC RECORDER

TECHNICAL FIELD

The present invention relates to an optical head for optically recording or reproducing information with respect to an information recording medium such as an optical disc, an objective lens for use in the optical head, an optical disc device provided with the optical head, a computer provided with the optical disc device, an optical disc player provided with the optical disc device, and an optical disc recorder provided with the optical disc device.

BACKGROUND ART

An objective lens plays a role of converging laser light and forming a small light spot on an information recording surface of an information recording medium such as an optical disc. There is widely used a technique of combining a refractive lens and a diffraction structure in order to implement a compatible lens for converging laser light through a single objective lens with respect to optical discs having different protective substrate thicknesses such as a compact disc (CD), a digital versatile disc (DVD), and a Blu-ray disc (BD) (see e.g. patent literature 1).

It is known that an objective lens provided with a diffraction structure (a step structure having a step for giving an optical path length difference with respect to an incident light flux) generates diffracted light (normal diffracted order light) of normal order which is converged on an information recording surface of an optical disc, and generates diffracted light (unwanted diffracted order light) of unwanted order which is not converged on the information recording surface of the optical disc.

In view of the above, patent literature 2 discloses an optical head (an optical information recording/reproducing device) provided with an objective lens provided with a step structure having a step for giving an optical path length difference with respect to an incident light flux, and configured to generate normal diffracted order light which is converged on an information recording surface of an optical disc, and unwanted diffracted order light which is collected at a position away from the information recording surface of the optical disc, wherein the distance from a convergent position of normal diffracted order light to a collecting position of unwanted diffracted order light is twice or more of the pull-in range of a focus error signal to be obtained in recording or reproducing information with respect to the optical disc.

Patent literature 2 pays attention to a focus error signal in applying an objective lens provided with a diffraction structure (a step structure) to an optical head. In patent literature 2, in recording or reproducing information on or from an information recording surface of an optical disc, the zero-cross point of a focus error signal based on unwanted diffracted order light is greatly away from the zero-cross point of a focus error signal based on normal diffracted order light. Thus, patent literature 2 tries to maintain the waveform of a focus error signal to have an S-shape necessary for effectively implementing the focus servo function.

FIG. 14 is a diagram for describing the characteristics of a focus error signal disclosed in the conventional art. Referring to FIG. 14, the vertical axis indicates an intensity of a detected focus error signal, and the horizontal axis indicates a moving amount of an objective lens in the optical axis direction. The right side of FIG. 14 corresponds to a direction in which the objective lens is moved toward an optical disc, and the left side of FIG. 14 corresponds to a direction in which the objective lens is moved away from the optical disc.

Patent literature 2 is configured such that a collecting position of unwanted diffracted order light is greatly away from an information recording surface of an optical disc (in other words, a convergent position of normal diffracted order light). More specifically, the distance from a convergent position of normal diffracted order light to a collecting position of unwanted diffracted order light is configured to be twice or more of the pull-in range of a focus error signal to be obtained in recording or reproducing information with respect to an optical disc. The pull-in range of a focus error signal indicates a range in which the focus servo function is effectively implemented by driving an actuator in accordance with a control voltage, and corresponds to a linear range of a focus error signal based on normal diffracted order light illustrated in FIG. 14.

Patent literature 2 describes that the above configuration makes it possible to secure a large distance between the zero-cross point of a second focus error signal based on unwanted diffracted order light and the zero-cross point of a first focus error signal based on normal diffracted order light in recording or reproducing information on or from an information recording surface of an optical disc, and thereby, it is possible to maintain the waveform of the first focus error signal based on normal diffracted order light to have an S-shape necessary for effectively implementing the focus servo function.

Actually, however, as will be described later, in the case where an objective lens provided with a diffraction structure is applied to an optical head, a third focus error signal is generated between a first focus error signal based on normal diffracted order light and a second focus error signal based on unwanted diffracted order light. As a result, only with the configuration such that the distance from an information recording surface of an optical disc (in other words, a convergent position of normal diffracted order light) to a collecting position of unwanted diffracted order light is twice or more of the pull-in range of a focus error signal, the zero-cross point of the first focus error signal based on normal diffracted order light and the zero-cross point of the third focus error signal come close to each other, and it is impossible to maintain the waveform of the first focus error signal based on normal diffracted order light to have an S-shape necessary for effectively implementing the focus servo function.

As described above, patent literature 2 has no consideration about a third focus error signal which may appear at an intermediate position between a first focus error signal based on normal diffracted order light and a second focus error signal based on unwanted diffracted order light, and the focus servo function may not be effectively implemented.

CITATION LIST

Patent Literature

Patent literature 1: JP Hei 7-98431A
Patent literature 2: JP 2007-122851A

SUMMARY OF INVENTION

In view of the above, an object of the invention is to provide an optical head, an objective lens, an optical disc device, a computer, an optical disc player, and an optical disc recorder that enable to effectively implement the focus servo function in applying an objective lens provided with a diffraction structure to an optical head.

An optical head according to an aspect of the invention is an optical head for recording or reproducing information with respect to an information recording surface of a first information recording medium, an information recording surface of a second information recording medium, and an information recording surface of a third information recording medium, the first information recording medium, the second information recording medium, and the third information recording medium having protective substrate thicknesses different from each other. The optical head is provided with a light source configured to output laser light of a first wavelength λ1, laser light of a second wavelength λ2, and laser light of a third wavelength λ3, the first wavelength λ1, the second wavelength λ2, and the third wavelength λ3 being different from each other; and an objective lens configured to converge the laser light of the first wavelength λ1, the laser light of the second wavelength λ2, and the laser light of the third wavelength λ3 on the information recording surface of the first information recording medium, the information recording surface of the second information recording medium, and the information recording surface of the third information recording medium. The first wavelength λ1 satisfies a condition: 390 [nm]≤λ1≤430 [nm]. The second wavelength λ2 satisfies a condition: 630 [nm]≤λ2≤680 [nm]. The third wavelength λ3 satisfies a condition: 750 [nm]≤λ3≤810 [nm]. At least one surface of the objective lens is provided with a diffraction structure having a step for giving an optical path length difference with respect to the laser light to be incident on the objective lens. The diffraction structure is configured to generate normal diffracted order light which is converged on the information recording surface of the third information recording medium, and unwanted diffracted order light which is collected at a position away from the information recording surface of the third information recording medium, from laser light of the third wavelength λ3 transmitted through the objective lens. A distance from a convergent point of the normal diffracted order light, to a virtual collecting point formed by virtual diffracted order light between the convergent point of the normal diffracted order light and a collecting point of the unwanted diffracted order light is twice or more of a pull-in range of a focus error signal to be obtained in recording or reproducing information with respect to the third information recording medium.

According to the invention, it is possible to avoid an influence of virtual diffracted order light which forms a virtual collecting point between the convergent point of normal diffracted order light and the collecting point of unwanted diffracted order light on the focus error signal. This is advantageous in effectively implementing the focus servo function in applying an objective lens provided with a diffraction structure to an optical head.

These and other objects, features and advantages of the present invention will become more apparent upon reading the following detailed description along with the accompanying drawings.

DESCRIPTION OF EMBODIMENTS

Figure 1:
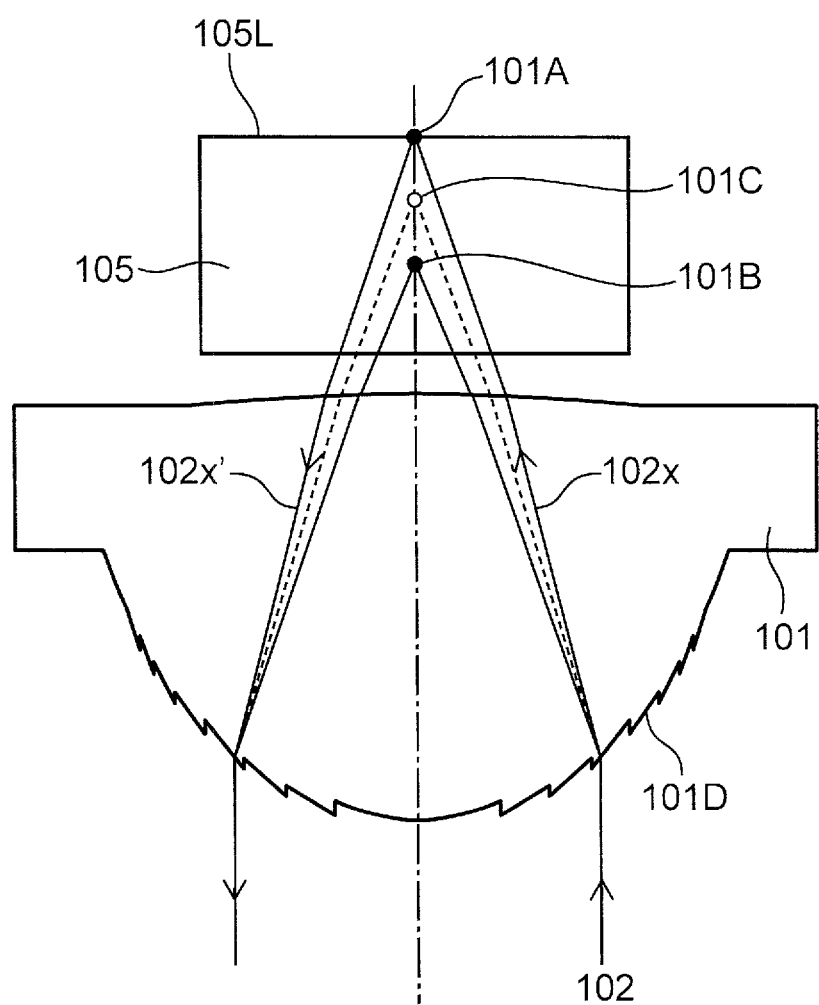
FIG. 1 is a schematic sectional view illustrating an objective lens according to the first embodiment of the invention.

In the following, embodiments of the invention will be described referring to the drawings. The following embodiments are merely an example of the invention, and do not limit the technical scope of the invention.

(First Embodiment)

First of all, the following is the reason why patent literature 2 fails to solve the drawback residing in patent literature 2, only with the configuration of patent literature 2, in which the distance from an information recording surface of an optical disc (in other words, a convergent position of normal diffracted order light) to a collecting position of unwanted diffracted order light is twice or more of the pull-in range of a focus error signal, in view of a point that a third focus error signal based on virtual diffracted order light is generated between a first focus error signal based on normal diffracted order light and a second focus error signal based on unwanted diffracted order light.

FIG. 1 is a schematic sectional view of an objective lens 101 according to the first embodiment of the invention. The objective lens 101 is configured to converge laser light of a first wavelength λ1, laser light of a second wavelength λ2, and laser light of a third wavelength λ3 different from each other on information recording surfaces of a first information recording medium, a second information recording medium, and a third information recording medium, whose protective substrate thicknesses differ from each other. The objective lens 101 is provided with a diffraction structure 101D having a step for giving an optical path length difference with respect to incident laser light, on at least one surface of the objective lens 101.

The diffraction structure 101D is configured to generate normal diffracted order light which is converged on the information recording surface of the third information recording medium, and unwanted diffracted order light which is collected at a position away from the information recording surface of the third information recording medium, from laser light of the third wavelength λ3 transmitted through the objective lens 101.

Further, the diffraction structure 101D gives a lens effect such that the distance from a convergent point of normal diffracted order light, to a virtual collecting point formed by virtual diffracted order light between the convergent point of normal diffracted order light and a collecting point of unwanted diffracted order light is twice or more of the pull-in range of a focus error signal to be obtained in recording or reproducing information with respect to the third information recording medium.

It should be noted that the first wavelength λ1 satisfies a condition: 390 [nm]≤λ1≤430 [nm], the second wavelength λ2 satisfies a condition: 630 [nm]≤λ2≤680 [nm], and the third wavelength λ3 satisfies a condition: 750 [nm]≤λ3≤810 [nm].

In the first embodiment, similar to the embodiment disclosed in patent literature 2, laser light of the third wavelength λ3 (λ3≈790 nm) is incident on the objective lens 101. Out of a plurality of diffracted light diffracted on the diffraction structure 101D formed on the incident surface of the objective lens 101, plus second-order diffracted light is converged on an information recording surface 105L of an optical disc 105 as a light spot 101A, and plus first-order diffracted light is collected as a light spot 101B. It should be noted that the focus position of plus first-order diffracted light is closer to the objective lens 101 than the focus position of plus second-order diffracted light.

A light ray 102 of the third wavelength λ3, after having been subjected to plus second-order diffraction by the diffraction structure 101D formed on the incident surface of the objective lens 101, propagates in a direction toward the light spot 101A, as illustrated by the arrow in FIG. 1. An optical path of a light ray 102x from incidence on the objective lens 101 to impingement on the information recording surface 105L of the optical disc 105 is called as an outward path. The light ray 102x reaches the light spot 101A when the information recording surface 105L of the optical disc 105 is present at the focus position of plus second-order diffracted light. A light ray 102x' reflected on the information recording surface 105L is subjected to plus second-order diffraction by the diffraction structure 101D formed on the incident surface of the objective lens 101. An optical path of the light ray 102x' from reflection on the information recording surface 105L of the optical disc 105 to exit through the objective lens 101 is called as a return path.

Diffracted light subjected to plus first-order diffraction is also generated by the diffraction structure 101D formed on the incident surface of the objective lens 101. Plus first-order diffraction has a strong effect of converging laser light, as compared with plus second-order diffraction, and therefore, plus first-order diffracted light is collected at the light spot 101B closer to the objective lens 101 than the light spot 101A. Diffracted light rays of different orders are collected at different positions because a diffraction effect has a lens effect (a lens power). The lens effect is substantially proportional to a diffraction angle, and the diffraction angle is substantially proportional to a diffraction order.

Assuming that the diffraction order of light on the outward path is L-order, and the diffraction order of light on the return path is K-order (where L and K are each an integer), it is conceived that laser light propagating on the outward path and on the return path is subjected to a diffraction effect of the sum (L+K) of the orders. In other words, it is conceived that laser light which has undergone a lens effect of plus second-order diffraction having a focal length to the light spot 101A on the outward path and on the return path is subjected to a diffraction power of (+2)+(+2)=plus fourth order.

On the other hand, it is conceived that laser light which has undergone a lens effect of plus first-order diffraction having a focal length to the light spot 101B on the outward path and on the return path is subjected to a diffraction power of (+1)+(+1)=plus second order.

From another point of view, it is conceived that laser light is collected at a position where the laser light is subjected to a diffraction power of the order of one-half of the sum of the orders on the outward path and on the return path.

For instance, in the case where the diffraction order of light on the outward path is plus second-order, and the diffraction order of light on the return path is plus second-order, the light spot 101A is formed at a focus position of plus second-order diffracted light, taking into account that: ((+2)+(+2))/2=+2. Further, in the case where the diffraction order of light on the outward path is plus first-order, and the diffraction order of light on the return path is plus first-order, the light spot 101B as a focus position of plus first-order diffracted light is formed, taking into account that: ((+1)+(+1))/2=+1.

Let us consider a case that the diffraction order of light on the outward path and the diffraction order of light on the return path are different from each other. For instance, it is conceived that laser light which has undergone a lens effect of plus second-order diffraction on the outward path and a lens effect of plus first-order diffraction on the return path is subjected to a diffraction power of (±2)+(+1)=+3 i.e. plus third-order. As described above, assuming that laser light is collected at a position where the laser light is subjected to a diffraction power of the order of one-half of the sum of the orders on the outward path and on the return path, it is conceived that the laser light forms a virtual light spot 101C at an intermediate position between the light spot 101A as a focus position of plus second-order diffracted light, and the light spot 101B as a focus position of plus first-order diffracted light, taking into account that: ((+2)+(+1))/2=+1.5. In other words, the light spot 101C is formed at a focus position of virtual plus 1.5-order diffracted light.

Accordingly, when the objective lens 101 is loaded on an optical head and a focus error signal is detected, a third focus error signal based on the virtual light spot 101C is generated at an intermediate position between a first focus error signal based on plus second-order diffracted light (the light spot 101A) as normal diffracted order light, and a second focus error signal based on plus first-order diffracted light (the light spot 101B) as unwanted diffracted order light.

In this embodiment, a third focus error signal based on the virtual light spot 101C is generated at a mid point position between a first focus error signal based on plus second-order diffracted light (the light spot 101A) as normal diffracted order light, and a second focus error signal based on plus first-order diffracted light (the light spot 101B) as unwanted diffracted order light. The invention is not specifically limited to the above. A third focus error signal based on the virtual light spot 101C may be generated at any position between a first focus error signal based on plus second-order diffracted light (the light spot 101A) as normal diffracted order light, and a second focus error signal based on plus first-order diffracted light (the light spot 101B) as unwanted diffracted order light.

Figure 2:
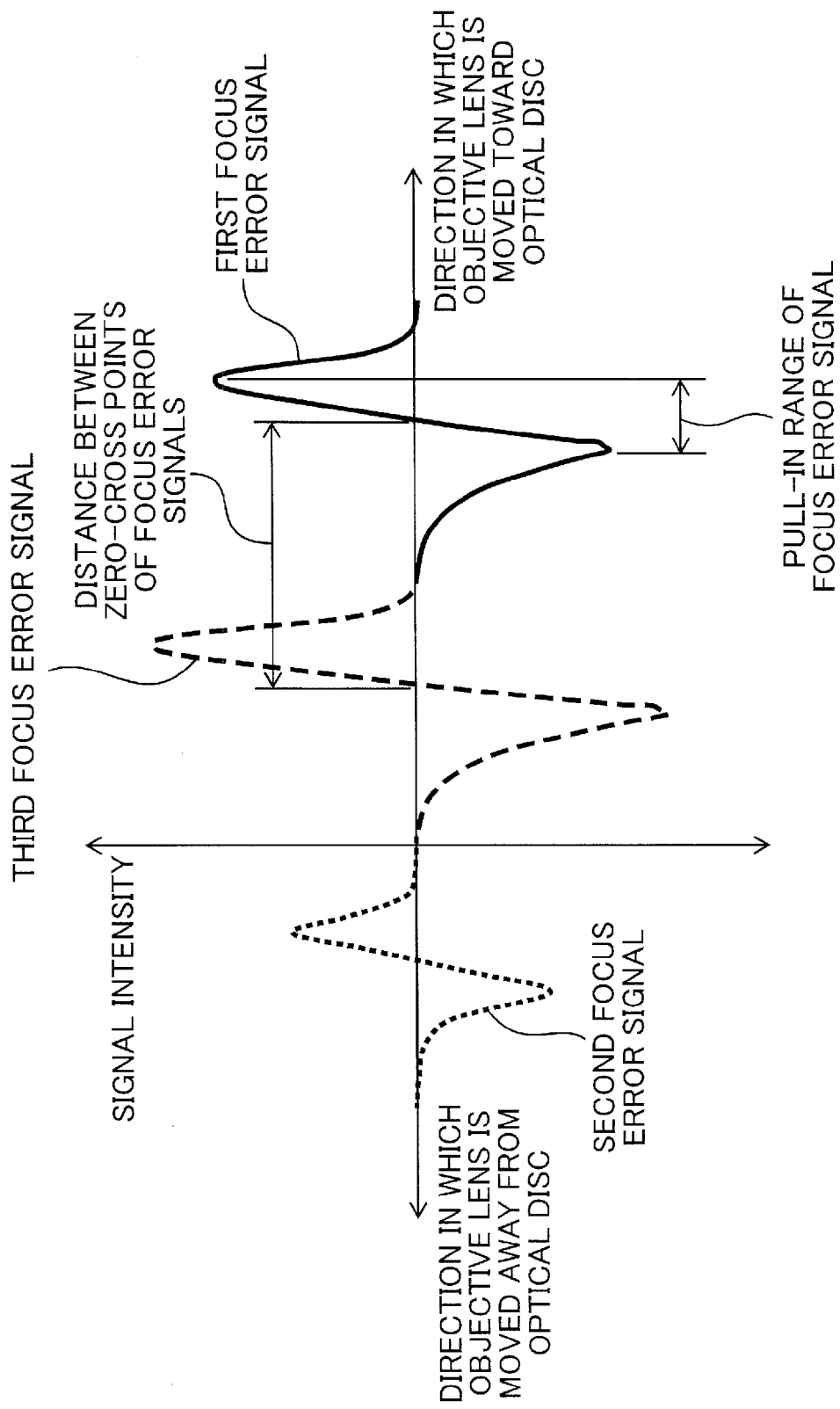
FIG. 2 is a diagram for describing the characteristics of a focus error signal based on diffracted light to be generated from the objective lens according to the first embodiment.

FIG. 2 is a diagram for describing the characteristics of a focus error signal based on diffracted light to be generated from the objective lens 101 according to the first embodiment. Referring to FIG. 2, the vertical axis indicates an intensity of a detected focus error signal, and the horizontal axis indicates a moving amount of an objective lens in the optical axis direction. The right side of FIG. 2 corresponds to a direction in which the objective lens is moved toward an optical disc, and the left side of FIG. 2 corresponds to a direction in which the objective lens is moved away from the optical disc.

As illustrated in FIG. 2, a third focus error signal based on the virtual light spot 101C is generated at an intermediate position between a first focus error signal based on the light spot 101A as a focus position of plus second-order diffracted light (normal diffracted order light), and a second focus error signal based on the light spot 101B as a focus position of plus first-order diffracted light (unwanted diffracted order light).

In both of the case that light undergoes a lens effect of plus second-order diffraction on the outward path and a lens effect of plus first-order diffraction on the return path, and the case that light undergoes a lens effect of plus first-order diffraction on the outward path and a lens effect of plus second-order diffraction on the return path, the light is subjected to a diffraction power of plus third-order in total. Accordingly, in both of the cases, the virtual light spot 101C is formed at a focus position of plus 1.5-order diffracted light, and both of the focus error signals appear to overlap each other.

In the case where the diffraction efficiency of plus second-order diffracted light and the diffraction efficiency of plus first-order diffracted light are equal to each other, assuming that the intensity of a first focus error signal based on normal diffracted order light to be incident on the light receiving element after the light has undergone a lens effect of plus second-order diffraction on the outward path and on the return path is 1, the intensity of a second focus error signal based on unwanted diffracted order light to be incident on the light receiving element after the light has undergone a lens effect of plus first-order diffraction on the outward path and on the return path is also 1.

On the other hand, the intensity of a focus error signal based on a virtual light spot to be incident on the light receiving element after the light has undergone a lens effect of plus second-order diffraction on the outward path and a lens effect of plus first-order diffraction on the return path is also 1, and the intensity of a focus error signal based on a virtual light spot to be incident on the light receiving element after the light has undergone a lens effect of plus first-order diffraction on the outward path and a lens effect of plus second-order diffraction on the return path is also 1. Accordingly, the intensity of a third focus error signal to be obtained by overlapping both of the focus error signals is 2.

Further, in the case where the ratio between the diffraction efficiency of plus second-order diffracted light and the diffraction efficiency of plus first-order diffracted light is 1:0.5, assuming that the intensity of a first focus error signal based on normal diffracted order light to be incident on the light receiving element after the light has undergone a lens effect of plus second-order diffraction on the outward path and on the return path is 1, the intensity of a second focus error signal based on unwanted diffracted order light to be incident on the light receiving element after the light has undergone a lens effect of plus first-order diffraction on the outward path and on the return path is 0.25.

On the other hand, the intensity of a focus error signal based on a virtual light spot to be incident on the light receiving element after the light has undergone a lens effect of plus second-order diffraction on the outward path and a lens effect of plus first-order diffraction on the return path is 0.5, and the intensity of a focus error signal based on a virtual light spot to be incident on the light receiving element after the light has undergone a lens effect of plus first-order diffraction on the outward path and a lens effect of plus second-order diffraction on the return path is 0.5, respectively. Accordingly, the intensity of a third focus error signal to be obtained by overlapping both of the focus error signals is 1.

This reveals that the intensity of a third focus error signal based on a virtual light spot, which is not disclosed in patent literature 2, may be larger than the intensity of a second focus error signal based on unwanted diffracted order light. Accordingly, the configuration disclosed in patent literature 2 may fail to achieve the object of patent literature 2 i.e. maintaining the waveform of a first focus error signal based on normal diffracted order light to have an S-shape necessary for effectively implementing the focus servo function.

To generalize the above phenomenon, in an objective lens provided with a diffraction structure configured to distribute laser light to be incident on the objective lens into diffracted light of at least two diffraction orders i.e. M-order and N-order (where M and N are integers different from each other), a virtual collecting point may appear to be formed at an intermediate point between the collecting point of M-order diffracted light and the collecting point of N-order diffracted light. In view of the above, the inventors of the present application found out that a third focus error signal is generated between a focus error signal based on M-order diffracted light and a focus error signal based on N-order diffracted light, and that the intensity of the third focus error signal may be larger than the intensity of the focus error signal based on M-order diffracted light and/or the intensity of the focus error signal based on N-order diffracted light.

As described above, the configuration disclosed in patent literature 2 such that the distance from an information recording surface of an optical disc (i.e. a convergent position of normal diffracted order light) to a collecting position of unwanted diffracted order light is about twice of the pull-in range of a focus error signal may fail to maintain the waveform of a first focus error signal to have an S-shape necessary for effectively implementing the focus servo function, because the zero-cross point of a first focus error signal component based on a light spot of normal diffracted order light, and the zero-cross point of a third focus error signal component based on a virtual light spot come close to each other.

In view of the above, the objective lens 101 according to the first embodiment is provided with a diffraction structure configured to distribute laser light to be incident on the objective lens 101 into diffracted light of at least two diffraction orders i.e. M-order and N-order (where M and N are integers different from each other), and configured to converge M-order diffracted light on an information recording surface of an optical disc as normal diffracted order light. Further, the objective lens 101 according to the first embodiment is configured such that the distance between a collecting point of M-order diffracted light, and a virtual collecting point at an intermediate point between the collecting point of M-order diffracted light and a collecting point of N-order diffracted light is twice or more of the pull-in range of a focus error signal (a linear range of a first focus error signal based on normal diffracted order light illustrated in FIG. 2) in order to maintain an S-shape necessary for effectively implementing the focus servo function.

Specifically, the distance from a convergent position of normal diffracted order light to a position of a virtual light spot formed by virtual diffracted order light is twice or more of the pull-in range of a focus error signal to be obtained in recording or reproducing information with respect to the third information recording medium.

Further, a third focus error signal to be detected based on virtual diffracted order light is detected between a first focus error signal to be detected based on normal diffracted order light, and a second focus error signal to be detected based on unwanted diffracted order light. Furthermore, the amplitude of the third focus error signal is larger than the amplitude of the second focus error signal.

Patent literature 2 discloses a point that a focus error signal is maintained to have an S-shape necessary for effectively implementing the focus servo function. However, unwanted diffracted order light also affects a parameter other than the focus error signal.

Figure 3:
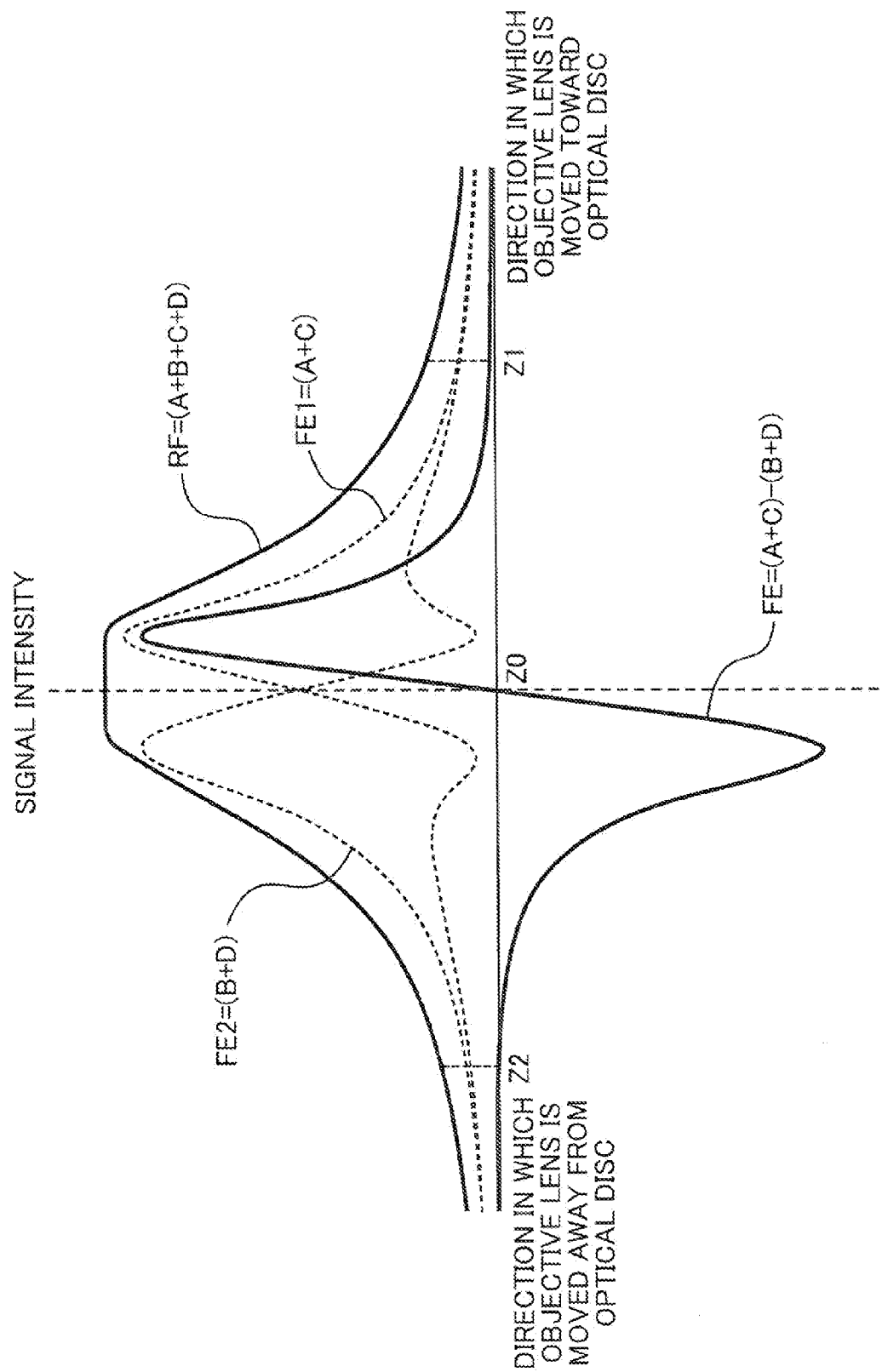
FIG. 3 is a diagram illustrating a comparison between a waveform of a focus error signal and a waveform of an information signal.

FIG. 3 is a diagram illustrating a comparison between a waveform of a focus error signal and a waveform of an information signal. Further, FIG. 4 is a diagram illustrating a configuration of a light receiving element provided with a four part pattern.

Referring to FIG. 3, the vertical axis indicates a signal intensity of a focus error signal and a signal intensity of an information signal, and the horizontal axis indicates a moving amount of an objective lens in the optical axis direction. The right side of FIG. 3 corresponds to a direction in which the objective lens is moved toward an optical disc, and the left side of FIG. 3 corresponds to a direction in which the objective lens is moved away from the optical disc.

Figure 4:
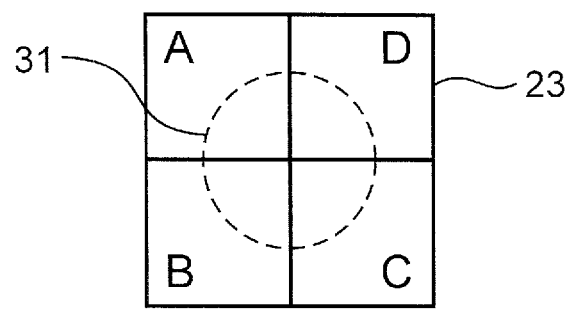
FIG. 4 is a diagram illustrating a configuration of a light receiving element provided with a four part pattern.

A light receiving element 23 is provided with a four part pattern as illustrated in FIG. 4, and a detection light spot 31 is formed on the light receiving element 23. A focus error signal FE to be obtained by a general astigmatism method is expressed by the following formula (1) using electric signals A to D to be respectively output from four light receiving parts of the light receiving element 23.

$$FE = FE1 - FE2 = (A+C) - (B+D) \quad (1)$$

On the other hand, an information signal RF is expressed by the following formula (2), in view of a point that the information signal RF is a sum of the electric signals A to D to be respectively output from the four light receiving parts of the light receiving element 23.

$$RF = FE1 + FE2 = A + B + C + D \quad (2)$$

Accordingly, as illustrated in FIG. 3, the light amount is maximum near the zero-cross point Z0 of the focus error signal FE, and decreases as the objective lens is moved away from the zero-cross point Z0 of the focus error signal FE.

What should be paid attention to is the signal intensity of the focus error signal FE and the signal intensity of the information signal RF, in the case where the objective lens is greatly deviated from the zero-cross point Z0 of the focus error signal FE in a direction in which the objective lens is moved toward the optical disc (or in a direction in which the objective lens is moved away from the optical disc).

For instance, whereas the focus error signal FE as a difference between the signal FE1 and the signal FE2 is substantially zero at the point Z1 (or at the point Z2) illustrated in FIG. 3, the information signal RF as a sum of the signal FE1 and the signal FE2 is not zero. In other words, this means that the information signal RF is greatly affected by the position which is greatly away from the zero-cross point Z0 of the focus error signal FE, as compared with the focus error signal FE.

The aforementioned relationship between the focus error signal FE and the information signal RF is also applied to a third focus error signal and a third information signal based on a virtual light spot, and to a second focus error signal and a second information signal based on unwanted diffracted order light, as well as to a first focus error signal and a first information signal based on normal diffracted order light.

Figure 5:
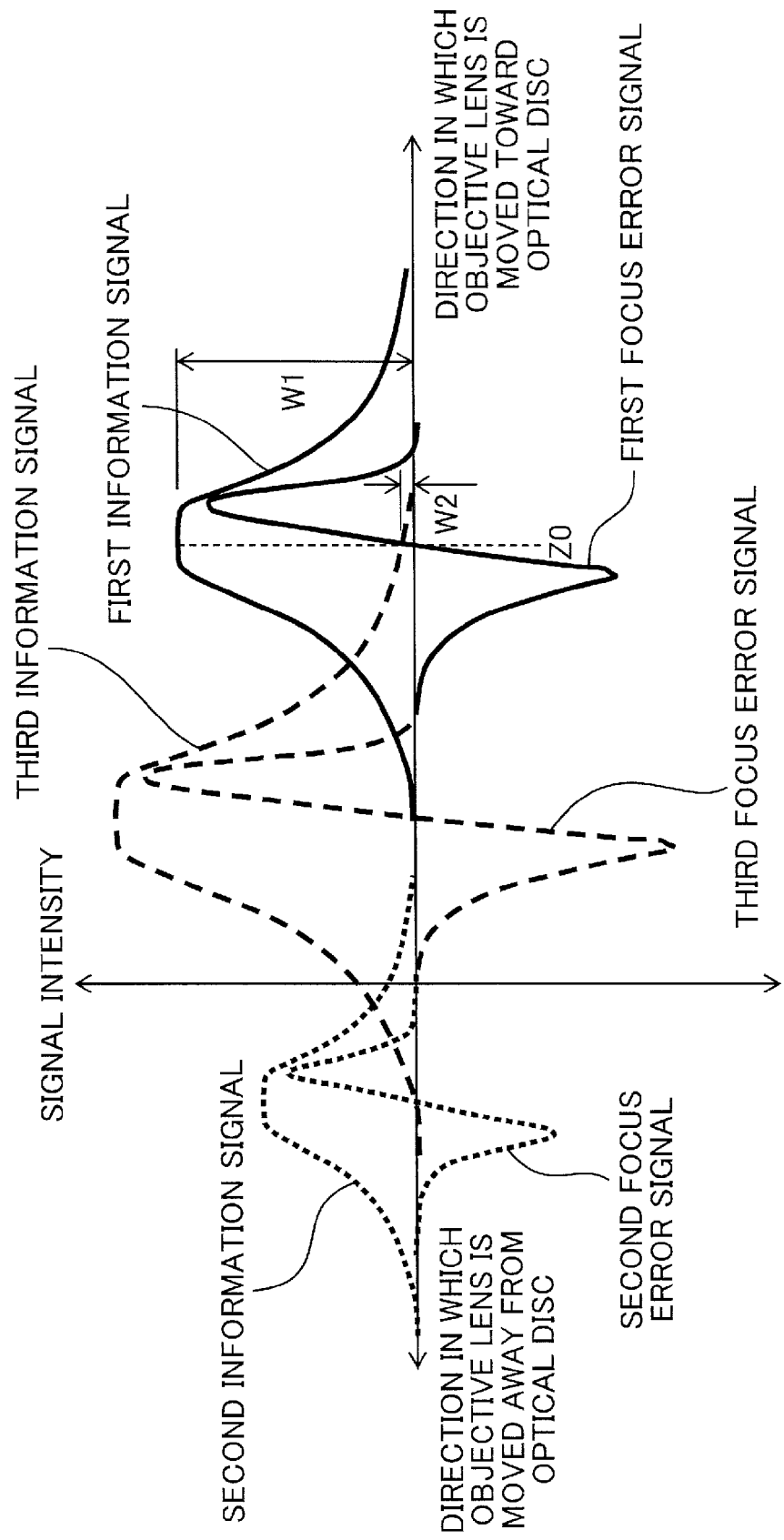
FIG. 5 is a diagram for describing the characteristics of a first focus error signal, a second error signal, and a third error signal, and of a first information signal, a second information signal, and a third information signal based on diffracted light to be generated from the objective lens according to the first embodiment.

For instance, the drawing of FIG. 5 is obtained by overlapping a first information signal based on normal diffracted order light, a third information signal based on a virtual light spot, and a second information signal based on unwanted diffracted order light on the drawing of FIG. 2. FIG. 5 is a diagram for describing the characteristics of the first to third focus error signals and of the first to third information signals based on diffracted light to be generated from the objective lens 101 according to the first embodiment.

As is obvious from FIG. 5, at the point Z0 (a zero-cross point of a first focus error signal based on normal diffracted order light) at which information is recorded or reproduced on or from an optical disc, not only the signal intensity of a third focus error signal based on a virtual light spot is substantially zero, but also the signal intensity of the third focus error signal is substantially zero. This reveals that both of the third focus error signal and the third information signal based on a virtual light spot are in an idealistic state free of influence in recording or reproducing on or from an optical disc.

Specifically, at the zero-cross point Z0 of a first focus error signal based on normal diffracted order light, an offset (a signal intensity) of a third focus error signal based on a virtual light spot is sufficiently small. Accordingly, it is possible to effectively implement the focus servo function. Further, at the zero-cross point Z0 of a first focus error signal based on normal diffracted order light, the signal intensity of a third information signal based on a virtual light spot is sufficiently small. Accordingly, it is possible to obtain a high-quality information signal, without interference between a detection light spot based on normal diffracted order light and a detection light spot based on a virtual light spot on the light receiving element.

The inventors experimentally found out that a condition that makes it possible to avoid interference between a detection light spot based on normal diffracted order light, and a detection light spot based on a virtual light spot on the light receiving element, at the zero-cross point Z0 of the first focus error signal based on normal diffracted order light (more precisely, a condition that makes it possible to substantially ignore influence of light interference) is such that the signal intensity W2 of the third information signal based on a virtual light spot is not larger than 1%, assuming that the signal intensity W1 of the first information signal based on normal diffracted order light is 100%.

On the other hand, as disclosed in patent literature 2, only with the configuration such that the distance from an information recording surface of an optical disc (in other words, a convergent position of normal diffracted order light) to a collecting position of unwanted diffracted order light is about twice of the pull-in range of a focus error signal, the distance from the convergent point of normal diffracted order light to the virtual collecting point is at most substantially equal to the pull-in range of a focus error signal. Accordingly, it is impossible to maintain an S-shape necessary for effectively implementing the focus servo function. Further, patent literature 2 fails to obtain a sufficiently small signal intensity of the third information signal based on a virtual light spot, with the result that a detection light spot based on normal diffracted order light, and a detection light spot based on a virtual light spot interfere with each other on the light receiving element. Thus, it is impossible to obtain a high-quality information signal.

The first embodiment is advantageously applied to a compatible lens configured to converge light through a single objective lens with respect to optical discs of different types having different protective substrate thicknesses such as a compact disc (CD), a digital versatile disc (DVD), and a Blu-ray disc (BD).

Figure 6:
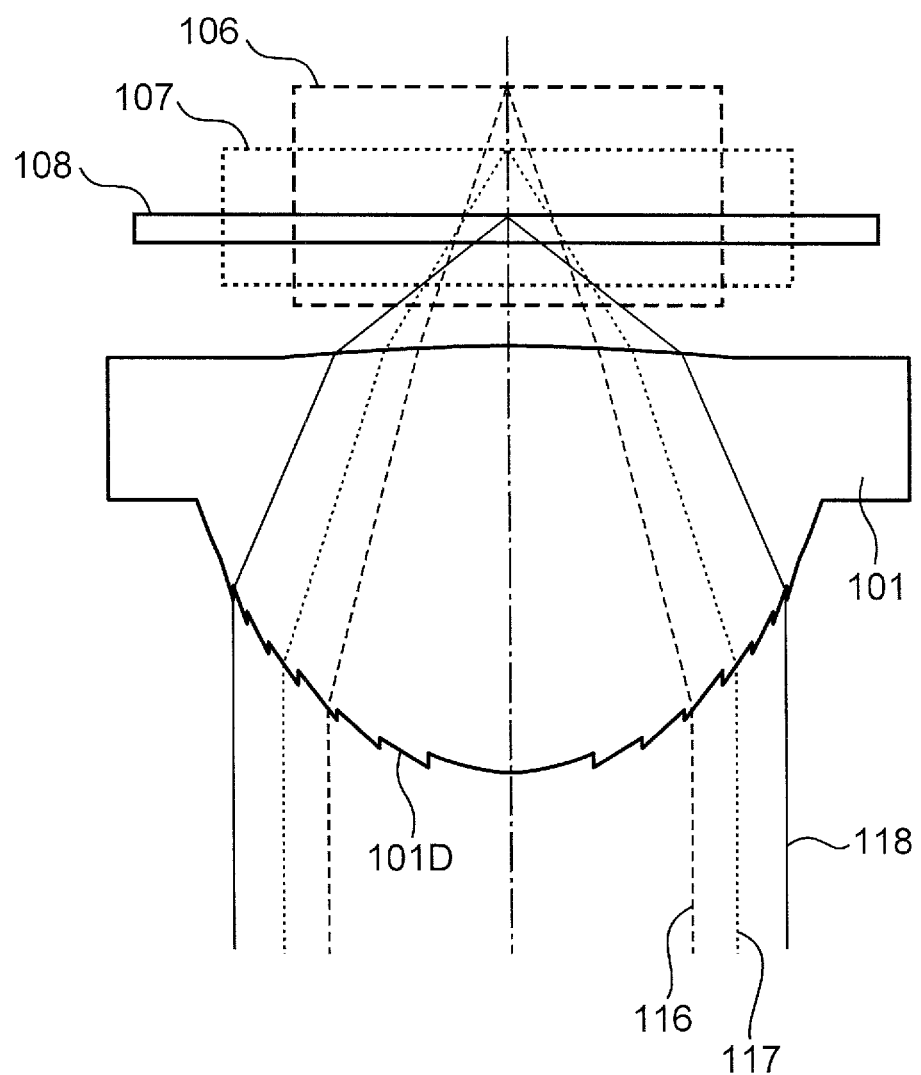
FIG. 6 is a schematic sectional view illustrating the objective lens according to the first embodiment of the invention, and a plurality of optical discs having different protective substrate thicknesses from each other.

FIG. 6 is a schematic sectional view illustrating the objective lens 101 according to the first embodiment of the invention, and a plurality of optical discs having protective substrate thicknesses different from each other.

The objective lens 101 illustrated in FIG. 6 is configured to converge infrared laser light 116 to be incident on an innermost periphery of the objective lens 101 near the optical axis thereof, on an information recording surface of a low-density optical disc 106 such as CD, whose protective substrate thickness is about 1.2 mm. Further, the objective lens 101 is configured to converge red laser light 117 to be incident on the innermost periphery and on an intermediate periphery on the outside of the innermost periphery, on an information recording surface of an optical disc 107 such as DVD, whose protective substrate thickness is about 0.6 mm. Furthermore, the objective lens 101 is configured to converge blue-violet laser light 118 to be incident in a region corresponding to the effective diameter of the objective lens 101, on an information recording surface of a high-density optical disc 108 such as BD, whose protective substrate thickness is about 0.1 mm or smaller than 0.1 mm.

It should be noted that the first wavelength $\lambda 1$ of the blue-violet laser light 118 satisfies a condition: 390 [nm]$\leq\lambda 1\leq$430 [nm], the second wavelength $\lambda 2$ of the red laser light 117 satisfies a condition: 630 [nm]$\leq\lambda 2\leq$680 [nm], and the third wavelength $\lambda 3$ of the infrared laser light 116 satisfies a condition: 750 [nm]$\leq\lambda 3\leq$810 [nm].

As described above, it is effective to use a diffraction structure disclosed in e.g. the specification of Japanese Patent No. 3,661,680, the specification of Japanese Patent No. 3,993,870, or International Publication No. 2009/016847 in a compatible objective lens configured to converge laser light of an intended wavelength on information recording surfaces of optical discs, whose protective substrate thicknesses differ from each other.

The diffraction structure is designed to discontinue an innermost periphery including the optical axis, an intermediate periphery on the outside of the innermost periphery, and an outermost periphery on the outside of the intermediate periphery. According to the above configuration, it is possible to converge laser light of an intended wavelength on information recording surfaces of optical discs, whose protective substrate thicknesses differ from each other, on the innermost periphery of the diffraction structure. Further, it is possible to converge laser light of an intended wavelength only on a high-density optical disc, whose protective substrate thickness is about 0.1 mm or smaller than 0.1 mm on the outermost periphery of the diffraction structure.

The objective lens 101 according to the first embodiment of the invention illustrated in FIG. 6 is provided with the diffraction structure 101D on the incident surface side (on the light source side) of the objective lens 101. The invention is not specifically limited to the above. A refractive lens configured to refract and collect laser light, and a diffraction element configured to diffract laser light may be individually provided. Further, the objective lens 101 may be provided with a diffraction structure on the exit surface side (on the optical disc side) of the objective lens 101.

The three focal points illustrated in FIG. 6 are light spots formed by laser light of wavelengths different from each other, and are completely different from the three focal points illustrated in FIG. 1, specifically, light spots (or virtual light spots) to be formed by subjecting laser light of one wavelength to diffraction of orders different from each other.

Further, as illustrated in FIG. 2, in the first embodiment, a third focus error signal is detected between a first focus error signal and a second focus error signal. The invention is not specifically limited to the above. A plurality of third focus error signals may be detected between a first focus error signal and a second focus error signal.

In the above modification, preferably, the distance between the zero-cross point of a third focus error signal closest to the first focus error signal, out of the plurality of third focus error signals, and the zero-cross point of the first focus error signal may be twice or more of the pull-in range of the first focus error signal to be obtained in recording or reproducing information with respect to the third information recording medium.

Further, the distance between the zero-cross point of a third focus error signal having a larger amplitude than the amplitude of the second focus error signal, out of the plurality of third focus error signals, and the zero-cross point of the first focus error signal may be twice or more of the pull-in range of the first focus error signal to be obtained in recording or reproducing information with respect to the third information recording medium.

Furthermore, the distance between the zero-cross point of a third focus error signal having a largest amplitude, out of the plurality of third focus error signals, and the zero-cross point of the first focus error signal may be twice or more of the pull-in range of the first focus error signal to be obtained in recording or reproducing information with respect to the third information recording medium.

(Second Embodiment)

Figure 7:
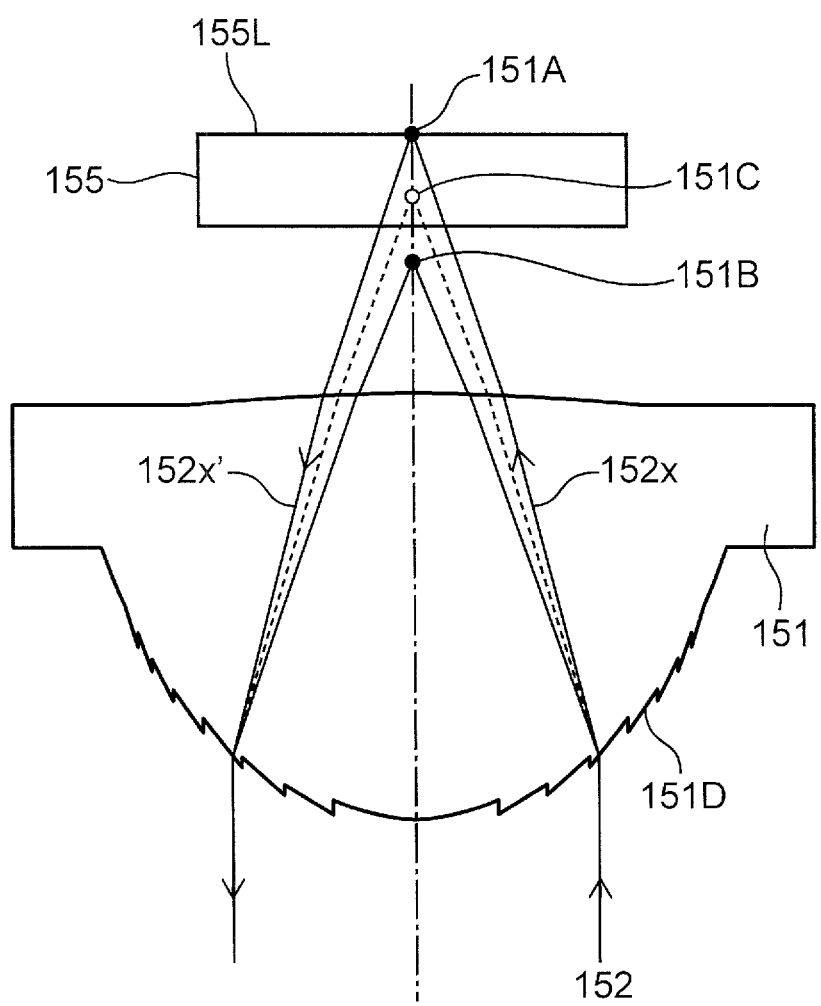
FIG. 7 is a schematic sectional view illustrating an objective lens according to the second embodiment of the invention.

FIG. 7 is a schematic sectional view illustrating an objective lens 151 according to the second embodiment of the invention. The objective lens 151 is configured to converge laser light of a first wavelength $\lambda 1$ and laser light of a second wavelength $\lambda 2$ different from each other on information recording surfaces of a first information recording medium and a second information recording medium, whose protective substrate thicknesses differ from each other. The objective lens 151 is provided with a diffraction structure 151D having a step for giving an optical path length difference with respect to incident laser light, on at least one surface of the objective lens 151.

The diffraction structure 151D is configured to generate normal diffracted order light which is converged on the information recording surface of the second information recording medium, and unwanted diffracted order light which is collected at a position away from the information recording surface of the second information recording medium, from laser light of the second wavelength $\lambda 2$ transmitted through the objective lens 151.

Further, the diffraction structure 151D gives a lens effect such that the distance from a convergent point of normal diffracted order light, to a virtual collecting point formed by virtual diffracted order light between the convergent point of normal diffracted order light and a collecting point of unwanted diffracted order light is twice or more of the pull-in range of a focus error signal to be obtained in recording or reproducing information with respect to the second information recording medium.

It should be noted that the first wavelength λ1 satisfies a condition: 390 [nm]≤λ1≤430 [nm], and the second wavelength λ2 satisfies a condition: 630 [nm]≤λ2≤680 [nm].

In the second embodiment, laser light of the second wavelength λ2 (λ2≈660 nm) is incident on the objective lens 151. Out of a plurality of diffracted light diffracted on the diffraction structure 151D formed on the incident surface of the objective lens 151, plus second-order diffracted light is converged on an information recording surface 155L of an optical disc 155 as a light spot 151A, and plus first-order diffracted light is collected as a light spot 151B. It should be noted that the focus position of plus first-order diffracted light is closer to the objective lens 151 than the focus position of plus second-order diffracted light.

A light ray 152 of the second wavelength λ2, after having been subjected to plus second-order diffraction by the diffraction structure 151D formed on the incident surface of the objective lens 151, propagates in a direction toward the light spot 151A, as illustrated by the arrow in FIG. 7. An optical path of a light ray 152x from incidence on the objective lens 151 to impingement on the information recording surface 155L of the optical disc 155 is called as an outward path. The light ray 152x reaches the light spot 151A when the information recording surface 155L of the optical disc 155 is present at the focus position of plus second-order diffracted light. A light ray 152x' reflected on the information recording surface 155L is subjected to plus second-order diffraction by the diffraction structure 151D formed on the incident surface of the objective lens 151. An optical path of the light ray 152x' from reflection on the information recording surface 155L of the optical disc 155 to exit through the objective lens 151 is called as a return path.

Diffracted light subjected to plus first-order diffraction is also generated by the diffraction structure 151D formed on the incident surface of the objective lens 151. Plus first-order diffraction has a strong effect of converging laser light, as compared with plus second-order diffraction, and therefore, plus first-order diffracted light is collected at a light spot 151B closer to the objective lens 151 than the light spot 151A.

Assuming that the diffraction order of light on the outward path is L-order, and the diffraction order of light on the return path is K-order (where L and K are each an integer), it is conceived that laser light propagating on the outward path and on the return path undergoes a diffraction effect of the sum (L+K) of the orders. In other words, it is conceived that laser light which has undergone a lens effect of plus second-order diffraction having a focal length to the light spot 151A on the outward path and on the return path is subjected to a diffraction power of (+2)+(+2)=plus fourth order.

On the other hand, it is conceived that laser light which has undergone a lens effect of plus first-order diffraction having a focal length to the light spot 151B on the outward path and on the return path is subjected to a diffraction power of (+1)+(+1)=plus second order.

Let us consider a case that the diffraction order of light on the outward path and the diffraction order of light on the return path are different from each other. For instance, it is conceived that laser light which has undergone a lens effect of plus second-order diffraction on the outward path and a lens effect of plus first-order diffraction on the return path is subjected to a diffraction power of (+2)+(+1)=+3 i.e. plus third-order. As described above, assuming that laser light is collected at a position where the laser light is subjected to a diffraction power of the order of one-half of the sum of the orders on the outward path and on the return path, it is conceived that the laser light forms a virtual light spot 151C at an intermediate position between the light spot 151A as a focus position of plus second-order diffracted light, and the light spot 151B as a focus position of plus first-order diffracted light, taking into account that: ((+2)+(+1))/2=+1.5.

Accordingly, when the objective lens 151 is loaded on an optical head and a focus error signal is detected, a third focus error signal based on the virtual light spot 151C is generated at an intermediate position between a first focus error signal based on plus second-order diffracted light (the light spot 151A) as normal diffracted order light, and a second focus error signal based on plus first-order diffracted light (the light spot 151B) as unwanted diffracted order light.

The characteristics of a focus error signal of the objective lens 151 according to the second embodiment are substantially the same as those illustrated in FIG. 2. As illustrated in FIG. 2, a third focus error signal based on the virtual light spot 151C is generated at an intermediate position between a first focus error signal based on the light spot 151A as a focus position of plus second-order diffracted light (normal diffracted order light), and a second focus error signal based on the light spot 151B as a focus position of plus first-order diffracted light (unwanted diffracted order light).

In both of the case that light undergoes a lens effect of plus second-order diffraction on the outward path and a lens effect of plus first-order diffraction on the return path, and the case that light undergoes a lens effect of plus first-order diffraction on the outward path and a lens effect of plus second-order diffraction on the return path, the light is subjected to a diffraction power of plus third-order in total. Accordingly, in both of the cases, a virtual light spot 151C is formed at a focus position of plus 1.5-order diffracted light, and both of the focus error signals appear to overlap each other.

The objective lens 151 according to the second embodiment is provided with a diffraction structure configured to distribute laser light to be incident on the objective lens 151 into diffracted light of at least two diffraction orders i.e. M-order and N-order (where M and N are integers different from each other), and configured to converge M-order diffracted light on an information recording surface of an optical disc as normal diffracted order light. Further, the objective lens 151 according to the second embodiment is configured such that the distance between a collecting point of M-order diffracted light, and a virtual collecting point at an intermediate point between the collecting point of M-order diffracted light and a collecting point of N-order diffracted light is twice or more of the pull-in range of a focus error signal (a linear range of a first focus error signal based on normal diffracted order light illustrated in FIG. 2) in order to maintain an S-shape necessary for effectively implementing the focus servo function.

Specifically, the distance from a convergent point of normal diffracted order light to a virtual collecting point formed by virtual diffracted order light is twice or more of the pull-in range of a focus error signal to be obtained in recording or reproducing information with respect to the second information recording medium.

Further, a third focus error signal to be detected based on virtual diffracted order light is detected between a first focus error signal to be detected based on normal diffracted order light, and a second focus error signal to be detected based on unwanted diffracted order light. Furthermore, the amplitude of the third focus error signal is larger than the amplitude of the second focus error signal.

The second embodiment is advantageously applied to a compatible lens configured to converge light through a single objective lens with respect to optical discs of different types having different protective substrate thicknesses such as a digital versatile disc (DVD) and a Blu-ray disc (BD).

Figure 8:
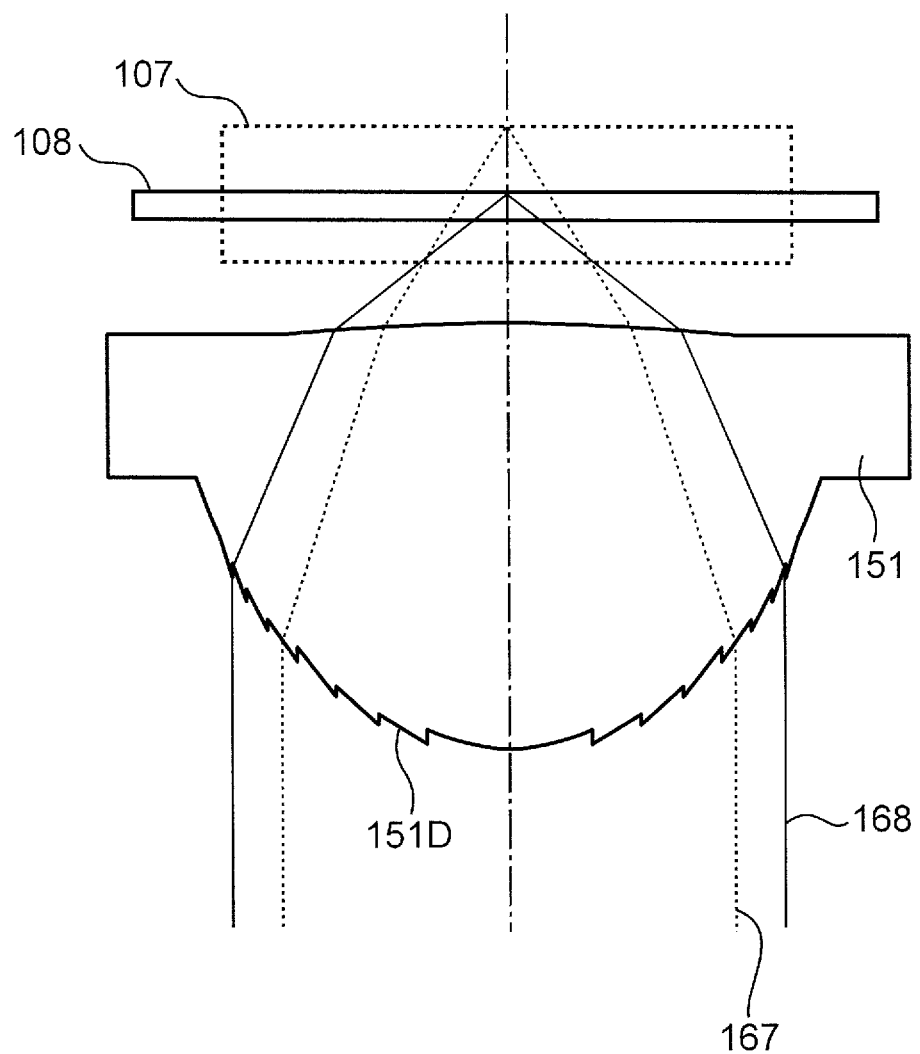
FIG. 8 is a schematic sectional view illustrating the objective lens according to the second embodiment of the invention, and a plurality of optical discs having different protective substrate thicknesses from each other.

FIG. 8 is a schematic sectional view illustrating the objective lens 151 according to the second embodiment of the invention, and a plurality of optical discs having different protective substrate thicknesses from each other.

The objective lens 151 illustrated in FIG. 8 is configured to converge red laser light 167 to be incident on an innermost periphery of the objective lens 151 near the optical axis thereof, on an information recording surface of an optical disc 107 such as DVD, whose protective substrate thickness is about 0.6 mm. Further, the objective lens 151 is configured to converge blue-violet laser light 168 to be incident in a region corresponding to the effective diameter of the objective lens 151, on an information recording surface of a high-density optical disc 108 such as BD, whose protective substrate thickness is about 0.1 mm or smaller than 0.1 mm.

It should be noted that the first wavelength λ1 of the blue-violet laser light 168 satisfies a condition: 390 [nm]≤λ1≤430 [nm], and the second wavelength λ2 of the red laser light 167 satisfies a condition: 630 [nm]≤λ2≤680 [nm].

As described above, it is effective to use a diffraction structure in a compatible objective lens configured to converge laser light of an intended wavelength on information recording surfaces of optical discs, whose protective substrate thicknesses differ from each other.

The diffraction structure is designed to discontinue an inner periphery including the optical axis, and an outer periphery on the outside of the inner periphery. According to the above configuration, it is possible to converge laser light of an intended wavelength on information recording surfaces of optical discs, whose protective substrate thicknesses differ from each other on the inner periphery of the diffraction structure. Further, it is possible to converge laser light of an intended wavelength only on a high-density optical disc, whose protective substrate thickness is about 0.1 mm or smaller than 0.1 mm on the outer periphery of the diffraction structure.

The objective lens 151 according to the second embodiment illustrated in FIG. 8 is provided with the diffraction structure 151D on the incident surface side (on the light source side) of the objective lens 151. The invention is not specifically limited to the above. A refractive lens configured to refract and collect laser light, and a diffraction element configured to diffract laser light may be individually provided. Further, the objective lens 151 may be provided with a diffraction structure on the exit surface side (on the optical disc side) of the objective lens 151.

Further, in the second embodiment, a third focus error signal is detected between a first focus error signal and a second focus error signal. The invention is not specifically limited to the above. A plurality of third focus error signals may be detected between a first focus error signal and a second focus error signal.

In the above modification, preferably, the distance between the zero-cross point of a third focus error signal closest to the first focus error signal, out of the plurality of third focus error signals, and the zero-cross point of the first focus error signal may be twice or more of the pull-in range of the first focus error signal to be obtained in recording or reproducing information with respect to the second information recording medium.

Further, the distance between the zero-cross point of a third focus error signal having a larger amplitude than the amplitude of the second focus error signal, out of the plurality of third focus error signals, and the zero-cross point of the first focus error signal may be twice or more of the pull-in range of the first focus error signal to be obtained in recording or reproducing information with respect to the second information recording medium.

Furthermore, the distance between the zero-cross point of a third focus error signal having a largest amplitude, out of the plurality of third focus error signals, and the zero-cross point of the first focus error signal may be twice or more of the pull-in range of the first focus error signal to be obtained in recording or reproducing information with respect to the second information recording medium.

(Third Embodiment)

Figure 9:
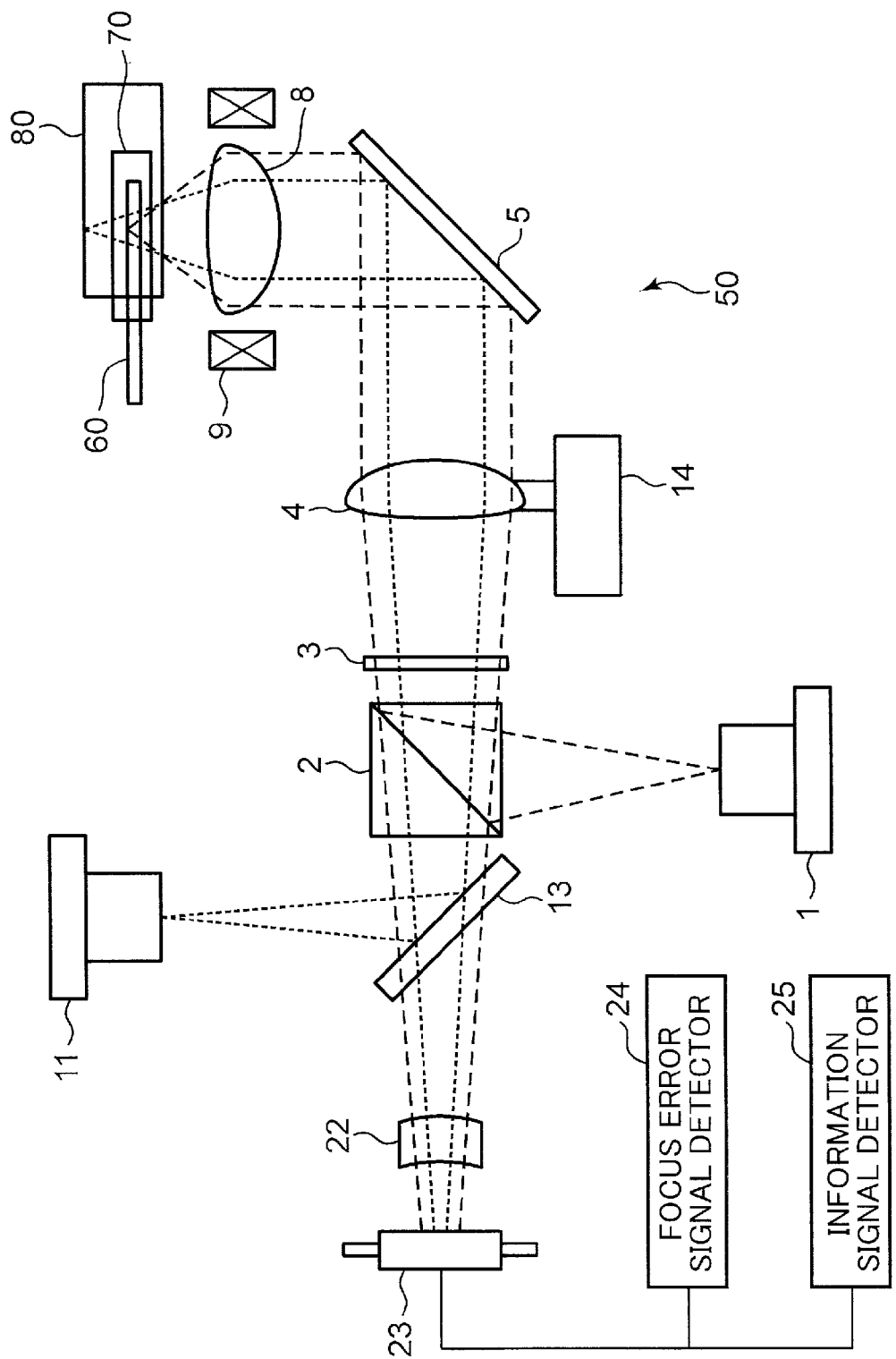
FIG. 9 is a diagram illustrating a schematic configuration of an optical head according to the third embodiment of the invention.

FIG. 9 is a diagram illustrating a schematic configuration of an optical head according to the third embodiment of the invention.

An optical head 50 according to the third embodiment is loaded with a compatible objective lens 8 configured to record or reproduce information on or from a BD 60 as a first information recording medium, a DVD 70 as a second information recording medium, and a CD 80 as a third information recording medium.

Referring to FIG. 9, the optical head 50 is provided with a blue-violet laser light source 1 configured to output blue-violet laser light, a polarization beam splitter 2, a quarter wave plate 3, a collimator lens 4, a mirror 5, the compatible objective lens 8, an objective lens actuator 9, a dual-wavelength laser light source 11 configured to output red laser light and infrared laser light, a flat plate beam splitter 13, a collimator lens actuator 14, an anamorphic lens 22, a light receiving element 23, a focus error signal detector 24, and an information signal detector 25.

It should be noted that the BD 60 is a generic example of BD optical discs, with respect to which information is recorded or reproduced with use of blue-violet laser light of a wavelength in the range of from about 390 nm to 430 nm, and with use of an objective lens having NA (numerical aperture) of about 0.8 to 0.9, and having a protective substrate thickness of about 0.05 to 0.125 mm. The BD 60 includes BD-ROM, BD-R, and BD-RE. Further, the BD 60 includes BD with a single information recording layer, BD with a dual-layer information recording layer, or BD with an information recording layer having three or more layers.

The DVD 70 is a generic example of DVD optical discs, with respect to which information is recorded or reproduced with use of red laser light of a wavelength in the range of from about 630 nm to 680 nm, and with use of an objective lens having NA of about 0.60 to 0.67, and having a protective substrate thickness of about 0.6 mm. The DVD 70 includes DVD-ROM, DVD-Video, DVD-Audio, DVD-RAM, DVD-R, DVD-RW, DVD+R, and DVD+RW.

The CD 80 is a generic example of CD optical discs, with respect to which information is recorded or reproduced with use of infrared laser light of a wavelength in the range of from about 750 nm to 810 nm, and with use of an objective lens having NA of about 0.45 to 0.52, and having a protective substrate thickness of about 1.2 mm. The CD 80 includes CD-ROM, CD-Audio, CD-Video, CD-R, and CD-RW.

It is needless to say that the compatible objective lens 8 according to the first embodiment is not only applicable to an existing optical disc such as BD, DVD, and CD, but is also widely applicable to a single objective lens and an optical head configured to record or reproduce information with respect to optical discs of different types, whose protective substrate thicknesses differ from each other.

In the following, an operation to be performed by the optical head 50 in recording or reproducing information on or from the BD 60 is described. Blue-violet laser light of about 405-nm wavelength output from the blue-violet laser light source 1 is incident on the polarization beam splitter 2 as S-polarized light. The blue-violet laser light reflected on the polarization beam splitter 2 is converted into circularly polarized light by the quarter wave plate 3, and thereafter, is converted into substantially parallel light by the collimator lens 4. The blue-violet laser light converted into substantially parallel light is reflected and bent on the mirror 5. The blue-violet laser light reflected on the mirror 5 is converged on the information recording surface of the BD 60 as a light spot by the compatible objective lens 8.

The blue-violet laser light reflected on the information recording surface of the BD 60 is transmitted through the compatible objective lens 8 again, and is reflected on the mirror 5. The blue-violet laser light reflected on the mirror 5 is transmitted through the collimator lens 4, and thereafter, is converted into linearly polarized light on a path other than the outward path by the quarter wave plate 3. The blue-violet laser light converted into linearly polarized light is incident and transmitted through the polarization beam splitter 2 as P-polarized light, and is incident and transmitted through the flat plate beam splitter 13 as P-polarized light. The blue-violet laser light transmitted through the flat plate beam splitter 13 is guided to the light receiving element 23 through the anamorphic lens 22, whereby a detection light spot is formed. The blue-violet laser light detected by the light receiving element 23 is subjected to photoelectric conversion, followed by computation. The computation yields a focus error signal for use in tracking plane deviation of the BD 60, a tracking error signal for use in tracking decentering of the BD 60, and an information signal.

The light receiving element 23 outputs an electric signal obtained by photoelectric conversion to the focus error signal detector 24 and to the information signal detector 25. The focus error signal detector 24 detects a focus error signal for use in tracking plane deviation of the BD 60, based on an electric signal from the light receiving element 23. The information signal detector 25 detects an information signal, based on an electric signal from the light receiving element 23.

Next, an operation to be performed by the optical head 50 in recording or reproducing information on or from the DVD 70 is described. Red laser light of about 660-nm wavelength output from the dual-wavelength laser light source 11 is incident on the flat plate beam splitter 13 as S-polarized light. The red laser light reflected on the flat plate beam splitter 13 is transmitted through the polarization beam splitter 2, is converted into circularly polarized light by the quarter wave plate 3, and thereafter, is converted into substantially parallel light by the collimator lens 4. The red laser light converted into substantially parallel light is reflected and bent on the mirror 5. The red laser light reflected on the mirror 5 is converged on the information recording surface of the DVD 70 as a light spot by the compatible objective lens 8.

The red laser light reflected on the information recording surface of the DVD 70 is transmitted through the compatible objective lens 8 again, and is reflected on the mirror 5. The red laser light reflected on the mirror 5 is transmitted through the collimator lens 4, and thereafter, is converted into linearly polarized light on a path other than the outward path by the quarter wave plate 3. The red laser light converted into linearly polarized light is incident and transmitted through the polarization beam splitter 2 as P-polarized light, and is incident and transmitted through the flat plate beam splitter 13 as P-polarized light. The red laser light transmitted through the flat plate beam splitter 13 is guided to the light receiving element 23 through the anamorphic lens 22, whereby a detection light spot is formed. The red laser light detected by the light receiving element 23 is subjected to photoelectric conversion, followed by computation. The computation yields a focus error signal for use in tracking plane deviation of the DVD 70, a tracking error signal for use in tracking decentering of the DVD 70, and an information signal.

The light receiving element 23 outputs an electric signal obtained by photoelectric conversion to the focus error signal detector 24 and to the information signal detector 25. The focus error signal detector 24 detects a focus error signal for use in tracking plane deviation of the DVD 70, based on an electric signal from the light receiving element 23. The information signal detector 25 detects an information signal, based on an electric signal from the light receiving element 23.

Next, an operation to be performed by the optical head 50 in recording or reproducing information on or from the CD 80 is described. Infrared laser light of about 780-nm wavelength output from the dual-wavelength laser light source 11 is incident on the flat plate beam splitter 13 as S-polarized light. The infrared laser light reflected on the flat plate beam splitter 13 is transmitted through the polarization beam splitter 2, is converted into circularly polarized light by the quarter wave plate 3, and thereafter, is converted into substantially parallel light by the collimator lens 4. The infrared laser light converted into substantially parallel light is reflected and bent on the mirror 5. The infrared laser light reflected on the mirror 5 is converged on the information recording surface of the CD 80 as a light spot by the compatible objective lens 8.

The infrared laser light reflected on the information recording surface of the CD 80 is transmitted through the compatible objective lens 8 again, and is reflected on the mirror 5. The infrared laser light reflected on the mirror 5 is transmitted through the collimator lens 4, and thereafter, is converted into linearly polarized light on a path other than the outward path by the quarter wave plate 3. The infrared laser light converted into linearly polarized light is incident and transmitted through the polarization beam splitter 2 as P-polarized light, and is incident and transmitted through the flat plate beam splitter 13 as P-polarized light. The infrared laser light transmitted through the flat plate beam splitter 13 is guided to the light receiving element 23 through the anamorphic lens 22, whereby a detection light spot is formed. The infrared laser light detected by the light receiving element 23 is subjected to photoelectric conversion, followed by computation. The computation yields a focus error signal for use in tracking plane deviation of the CD 80, a tracking error signal for use in tracking decentering of the CD 80, and an information signal.

The light receiving element 23 outputs an electric signal obtained by photoelectric conversion to the focus error signal detector 24 and to the information signal detector 25. The focus error signal detector 24 detects a focus error signal for use in tracking plane deviation of the CD 80, based on an electric signal from the light receiving element 23. The information signal detector 25 detects an information signal, based on an electric signal from the light receiving element 23.

The compatible objective lens 8 to be used in the optical head 50 according to the third embodiment is the objective lens 101 described in the first embodiment. Thus, the optical head 50 according to the third embodiment is configured to desirably record or reproduce information on or from the BD 60, the DVD 70, or the CD 80.

Further, the compatible objective lens 8 to be used in the optical head 50 according to the third embodiment may be the objective lens 151 described in the second embodiment. In the above modification, the optical head 50 is provided with a red laser light source configured to output only red laser light, in place of the dual-wavelength laser light source 11. Thus, the optical head 50 according to the third embodiment is configured to desirably record or reproduce information on or from the BD 60 or the DVD 70.

It should be noted that, in the third embodiment, the blue-violet laser light source 1 and the dual-wavelength laser light source 11 correspond to an example of a light source, and the compatible objective lens 8 corresponds to an example of an objective lens.

(Fourth Embodiment)

Figure 10:
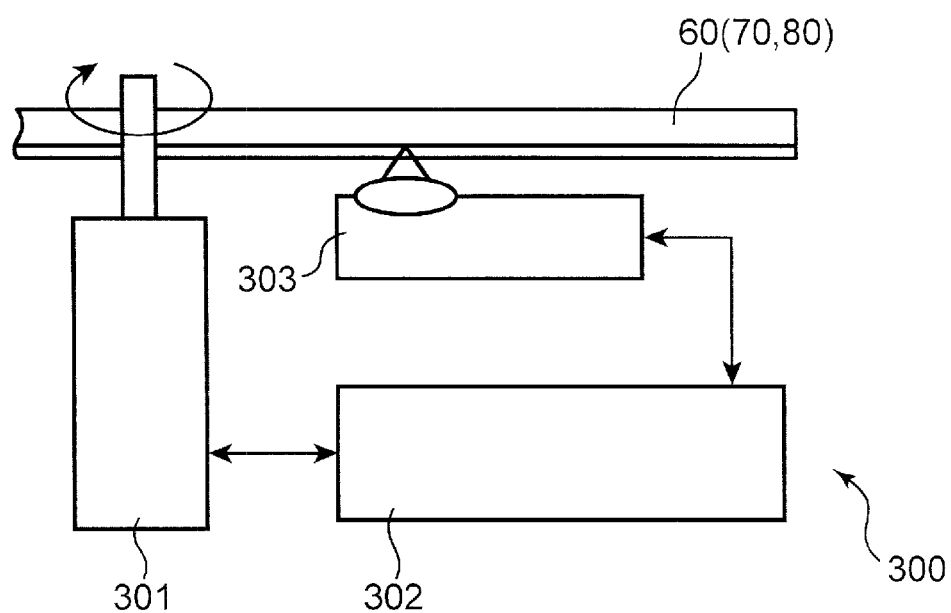
FIG. 10 is a diagram illustrating a schematic configuration of an optical disc device according to the fourth embodiment of the invention.

FIG. 10 is a diagram illustrating a schematic configuration of an optical disc device according to the fourth embodiment of the invention.

Referring to FIG. 10, an optical disc device 300 is provided with an optical disc driver (a motor) 301, a controller 302, and an optical head 303.

The optical disc driver 301 is configured to drive and rotate e.g. the BD 60 (or the DVD 70, or the CD 80). The optical head 303 is the optical head 50 described in the third embodiment. The controller 302 is configured to control driving of the optical disc driver 301 and the optical head 303, and to process a control signal and an information signal subjected to photoelectric conversion and computation by the optical head 303. Further, the controller 302 is provided with a function of interfacing an information signal between the exterior and the interior of the optical disc device 300.

In response to receiving a control signal from the optical head 303, the controller 302 performs focus control, tracking control, information reproduction control, and rotation control of the optical disc driver 301, based on the control signal. Further, the controller 302 reproduces information from an information signal, and transmits a recording signal to the optical head 303.

The optical disc device 300 is loaded with the optical head 50 described in the third embodiment. Accordingly, the optical disc device 300 according to the fourth embodiment is configured to desirably record or reproduce information on or from the BD 60, the DVD 70, or the CD 80.

(Fifth Embodiment)

Figure 11:
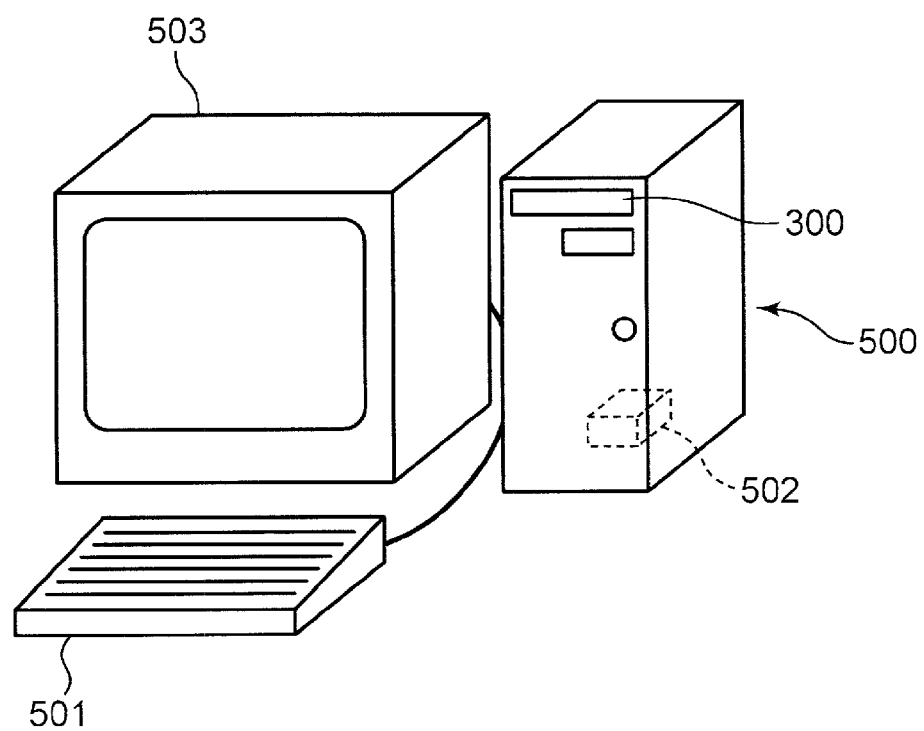
FIG. 11 is a diagram illustrating a schematic configuration of a computer according to the fifth embodiment of the invention.

FIG. 11 is a diagram illustrating a schematic configuration of a computer according to the fifth embodiment of the invention.

Referring to FIG. 11, a computer 500 is provided with the optical disc device 300 according to the fourth embodiment, an input device 501, an arithmetic device 502, and an output device 503.

The input device 501 is constituted of a keyboard, a mouse, or a touch panel, and is configured to input information. The arithmetic device 502 is constituted of a CPU (Central Processing Unit), and is configured to perform computation, based on e.g. information input from the input device 501 or information read from the optical disc device 300. The output device 503 is constituted of a display device (a cathode ray tube or a liquid crystal display device) or a printer, and is configured to output information such as a computation result by the arithmetic device 502. It should be noted that the display device is configured to display information such as a computation result by the arithmetic device 502, and the printer is configured to print information such as a computation result by the arithmetic device 502.

The computer 500 is provided with the optical disc device 300 according to the fourth embodiment, is configured to desirably record or reproduce information on or from the BD 60, the DVD 70, or the CD 80, and is applicable in a wide range.

(Sixth Embodiment)

Figure 12:
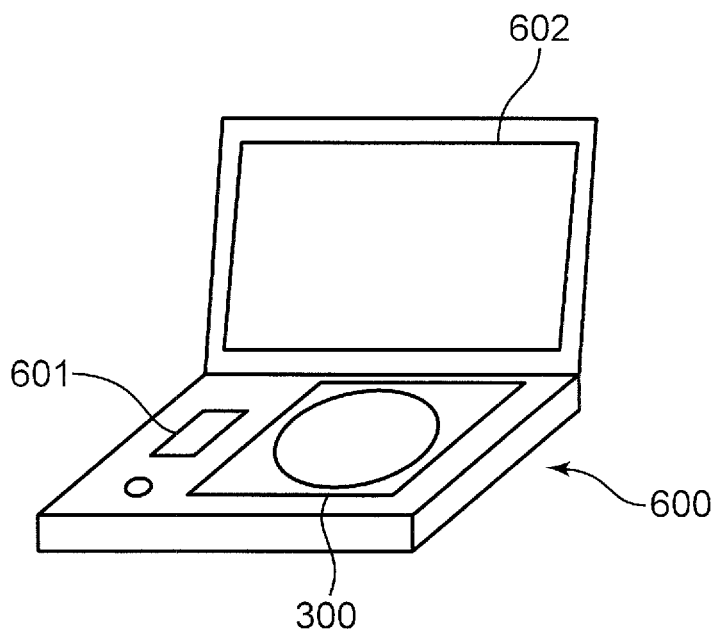
FIG. 12 is a diagram illustrating a schematic configuration of an optical disc player according to the sixth embodiment of the invention.

FIG. 12 is a diagram illustrating a schematic configuration of an optical disc player according to the sixth embodiment of the invention.

Referring to FIG. 12, an optical disc player 600 is provided with the optical disc device 300 according to the fourth embodiment, and a decoder 601 configured to convert an information signal to be obtained from the optical disc device 300 into an image signal.

It should be noted that the optical disc player 600 may also be usable as a car navigation system by incorporating a position sensor such as a GPS (Global Positioning System) and a CPU (Central Processing Unit). Further, the optical disc player 600 may also be provided with a display device 602. The display device 602 is constituted of e.g. a liquid crystal display device, and is configured to display an image signal converted by the decoder 601.

The optical disc player 600 is provided with the optical disc device 300 according to the fourth embodiment, is configured to desirably record or reproduce information on or from the BD 60, the DVD 70, or the CD 80, and is applicable in a wide range.

(Seventh Embodiment)

Figure 13:
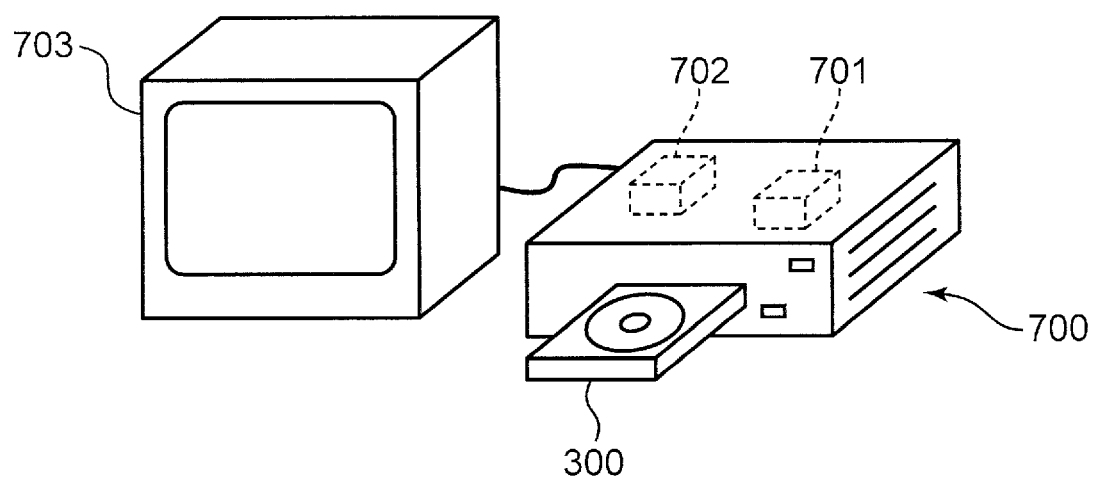
FIG. 13 is a diagram illustrating a schematic configuration of an optical disc recorder according to the seventh embodiment of the invention.
Figure 14:
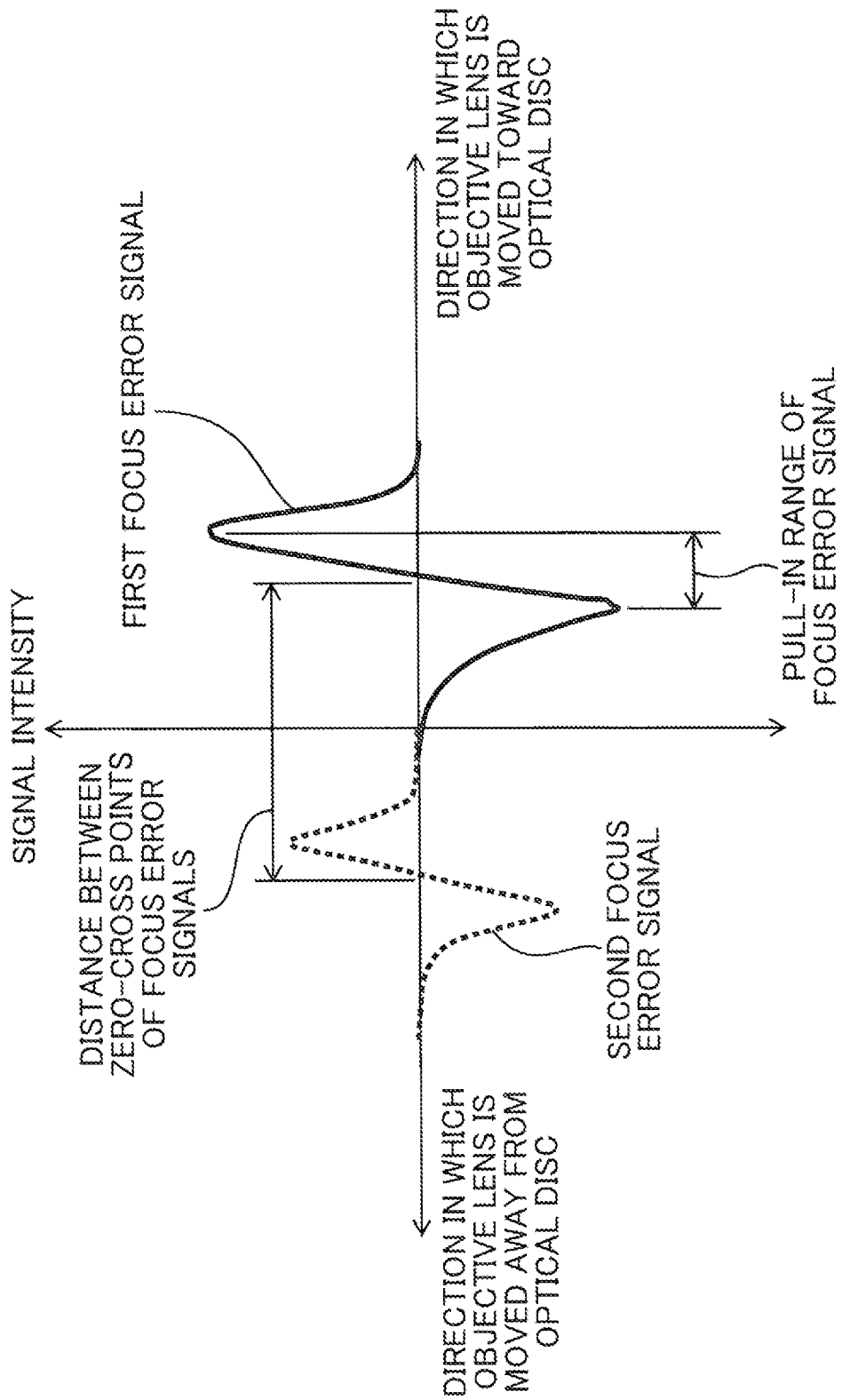
FIG. 14 is a diagram for describing the characteristics of a focus error signal disclosed in the conventional art.

FIG. 13 is a diagram illustrating a schematic configuration of an optical disc recorder according to the seventh embodiment of the invention.

Referring to FIG. 13, the optical disc recorder 700 is provided with the optical disc device 300 according to the fourth embodiment, and an encoder 701 configured to convert image information into an information signal to be recorded in an optical disc by the optical disc device 300. Desirably, the optical disc recorder 700 may also reproduce a recorded image by incorporating a decoder 702 configured to convert an information signal to be obtained from the optical disc device 300 into image information.

The optical disc recorder 700 may also be provided with an output device 703. The output device 703 may be constituted of a display device (a cathode ray tube or a liquid crystal display device) or a printer, and is configured to output an image signal converted by the decoder 702. The display device is configured to display an image signal converted by the decoder 702, and the printer is configured to print an image signal converted by the decoder 702.

The optical disc recorder 700 is provided with the optical disc device 300 according to the fourth embodiment, is configured to desirably record or reproduce information on or from the BD 60, the DVD 70, or the CD 80, and is applicable in a wide range.

The foregoing embodiments mainly include the invention having the following configurations.

An optical head according to an aspect of the invention is an optical head for recording or reproducing information with respect to an information recording surface of a first information recording medium, an information recording surface of a second information recording medium, and an information recording surface of a third information recording medium, the first information recording medium, the second information recording medium, and the third information recording medium having protective substrate thicknesses different from each other. The optical head is provided with a light source configured to output laser light of a first wavelength $\lambda 1$, laser light of a second wavelength $\lambda 2$, and laser light of a third wavelength $\lambda 3$, the first wavelength $\lambda 1$, the second wavelength $\lambda 2$, and the third wavelength $\lambda 3$ being different from each other; and an objective lens configured to converge the laser light of the first wavelength $\lambda 1$, the laser light of the second wavelength $\lambda 2$, and the laser light of the third wavelength λ3 on the information recording surface of the first information recording medium, the information recording surface of the second information recording medium, and the information recording surface of the third information recording medium. The first wavelength λ1 satisfies a condition: 390 [nm]≤λ1≤430 [nm]. The second wavelength λ2 satisfies a condition: 630 [nm]≤λ2≤680 [nm]. The third wavelength λ3 satisfies a condition: 750 [nm]≤λ3≤810 [nm]. At least one surface of the objective lens is provided with a diffraction structure having a step for giving an optical path length difference with respect to the laser light to be incident on the objective lens. The diffraction structure is configured to generate normal diffracted order light which is converged on the information recording surface of the third information recording medium, and unwanted diffracted order light which is collected at a position away from the information recording surface of the third information recording medium, from laser light of the third wavelength λ3 transmitted through the objective lens. A distance from a convergent point of the normal diffracted order light, to a virtual collecting point formed by virtual diffracted order light between the convergent point of the normal diffracted order light and a collecting point of the unwanted diffracted order light is twice or more of a pull-in range of a focus error signal to be obtained in recording or reproducing information with respect to the third information recording medium.

According to the above configuration, the light source outputs laser light of a first wavelength λ1, laser light of a second wavelength λ2, and laser light of a third wavelength λ3, the first wavelength λ1, the second wavelength λ2, and the third wavelength λ3 being different from each other. The objective lens is configured to converge the laser light of the first wavelength λ1, the laser light of the second wavelength λ2, and the laser light of the third wavelength λ3 on the information recording surface of the first information recording medium, the information recording surface of the second information recording medium, and the information recording surface of the third information recording medium. The first wavelength λ1 satisfies a condition: 390 [nm]≤λ1≤430 [nm]. The second wavelength λ2 satisfies a condition: 630 [nm]≤λ2≤680 [nm]. The third wavelength λ3 satisfies a condition: 750 [nm]≤λ3≤810 [nm]. At least one surface of the objective lens is provided with a diffraction structure having a step for giving an optical path length difference with respect to the laser light to be incident on the objective lens. The diffraction structure is configured to generate normal diffracted order light which is converged on the information recording surface of the third information recording medium, and unwanted diffracted order light which is collected at a position away from the information recording surface of the third information recording medium, from laser light of the third wavelength λ3 transmitted through the objective lens. A distance from a convergent point of the normal diffracted order light, to a virtual collecting point formed by virtual diffracted order light between the convergent point of the normal diffracted order light and a collecting point of the unwanted diffracted order light is twice or more of a pull-in range of a focus error signal to be obtained in recording or reproducing information with respect to the third information recording medium.

The above configuration makes it possible to avoid an influence, on a focus error signal, of virtual diffracted order light which forms a virtual collecting point between a convergent point of normal diffracted order light and a collecting point of unwanted diffracted order light. This is advantageous in effectively implementing the focus servo function in applying an objective lens provided with a diffraction structure to an optical head.

In the optical head, preferably, a third focus error signal to be detected based on the virtual diffracted order light may be generated between a first focus error signal to be detected based on the normal diffracted order light, and a second focus error signal to be detected based on the unwanted diffracted order light, and a distance from a zero-cross point of the first focus error signal to a zero-cross point of the third focus error signal may be twice or more of a pull-in range of the first focus error signal to be obtained in recording or reproducing information with respect to the third information recording medium.

According to the above configuration, a third focus error signal to be detected based on virtual diffracted order light is generated between a first focus error signal to be detected based on normal diffracted order light, and a second focus error signal to be detected based on unwanted diffracted order light. Further, the distance from a zero-cross point of the first focus error signal to a zero-cross point of the third focus error signal is twice or more of the pull-in range of the first focus error signal to be obtained in recording or reproducing information with respect to the third information recording medium.

The above configuration makes it possible to avoid an influence of the third focus error signal on the first focus error signal, and makes it possible to maintain the waveform of the first focus error signal to have an S-shape.

In the optical head, preferably, an amplitude of the third focus error signal may be larger than an amplitude of the second focus error signal.

According to the above configuration, the amplitude of the third focus error signal is larger than the amplitude of the second focus error signal. Thus, the third focus error signal greatly influences on the first focus error signal, as compared with the second focus error signal. The above configuration makes it possible to avoid an influence of the third focus error signal on the first focus error signal.

In the optical head, preferably, the third focus error signal may include a plurality of third focus error signals, and a distance between a zero-cross point of the third focus error signal closest to the first focus error signal, out of the plurality of the third focus error signals, to a zero-cross point of the first focus error signal may be twice or more of the pull-in range of the first focus error signal to be obtained in recording or reproducing information with respect to the third information recording medium.

According to the above configuration, the third focus error signal includes a plurality of third focus error signals. The distance between a zero-cross point of the third focus error signal closest to the first focus error signal, out of the plurality of the third focus error signals, to a zero-cross point of the first focus error signal is twice or more of the pull-in range of the first focus error signal to be obtained in recording or reproducing information with respect to the third information recording medium.

In the above configuration, even in the case where a plurality of third focus error signals are detected, it is possible to avoid an influence of the plurality of the third focus error signals on the first focus error signal.

In the optical head, preferably, the third focus error signal may include a plurality of third focus error signals, and a distance between a zero-cross point of the third focus error signal having a larger amplitude than an amplitude of the second focus error signal, out of the plurality of the third focus error signals, to the zero-cross point of the first focus error signal may be twice or more of the pull-in range of the first focus error signal to be obtained in recording or reproducing information with respect to the third information recording medium.

According to the above configuration, the third focus error signal includes a plurality of third focus error signals. The distance between a zero-cross point of the third focus error signal having a larger amplitude than an amplitude of the second focus error signal, out of the plurality of the third focus error signals, to the zero-cross point of the first focus error signal is twice or more of the pull-in range of the first focus error signal to be obtained in recording or reproducing information with respect to the third information recording medium.

In the above configuration, even in the case where a plurality of third focus error signals are detected, it is possible to avoid an influence of the plurality of the third focus error signals on the first focus error signal.

An optical head according to another aspect of the invention is an optical head for recording or reproducing information with respect to an information recording surface of a first information recording medium and an information recording surface of a second information recording medium, the first information recording medium and the second information recording medium having protective substrate thicknesses different from each other. The optical head is provided with a light source configured to output laser light of a first wavelength $\lambda 1$ and laser light of a second wavelength $\lambda 2$, the first wavelength $\lambda 1$ and the second wavelength $\lambda 2$ being different from each other; and an objective lens configured to converge the laser light of the first wavelength $\lambda 1$ and the laser light of the second wavelength $\lambda 2$ on the information recording surface of the first information recording medium and the information recording surface of the second information recording medium. The first wavelength $\lambda 1$ satisfies a condition: 390 [nm]$\leq \lambda 1 \leq$430 [nm]. The second wavelength $\lambda 2$ satisfies a condition: 630 [nm]$\leq \lambda 2 \leq$680 [nm]. At least one surface of the objective lens is provided with a diffraction structure having a step for giving an optical path length difference with respect to the laser light to be incident on the objective lens. The diffraction structure is configured to generate normal diffracted order light which is converged on the information recording surface of the second information recording medium, and unwanted diffracted order light which is collected at a position away from the information recording surface of the second information recording medium, from laser light of the second wavelength $\lambda 2$ transmitted through the objective lens. A distance from a convergent point of the normal diffracted order light, to a virtual collecting point formed by virtual diffracted order light between the convergent point of the normal diffracted order light and a collecting point of the unwanted diffracted order light is twice or more of a pull-in range of a focus error signal to be obtained in recording or reproducing information with respect to the second information recording medium.

According to the above configuration, the light source outputs laser light of a first wavelength $\lambda 1$ and laser light of a second wavelength $\lambda 2$, the first wavelength $\lambda 1$ and the second wavelength $\lambda 2$ being different from each other. The objective lens is configured to converge the laser light of the first wavelength $\lambda 1$ and the laser light of the second wavelength $\lambda 2$ on the information recording surface of the first information recording medium and the information recording surface of the second information recording medium. The first wavelength $\lambda 1$ satisfies a condition: 390 [nm]$\leq \lambda 1 \leq$430 [nm]. The second wavelength $\lambda 2$ satisfies a condition: 630 [nm]$\leq \lambda 2 \leq$680 [nm]. At least one surface of the objective lens is provided with a diffraction structure having a step for giving an optical path length difference with respect to the laser light to be incident on the objective lens. The diffraction structure is configured to generate normal diffracted order light which is converged on the information recording surface of the second information recording medium, and unwanted diffracted order light which is collected at a position away from the information recording surface of the second information recording medium, from laser light of the second wavelength $\lambda 2$ transmitted through the objective lens. A distance from a convergent point of normal diffracted order light, to a virtual collecting point formed by virtual diffracted order light between the convergent point of normal diffracted order light and a collecting point of unwanted diffracted order light is twice or more of a pull-in range of a focus error signal to be obtained in recording or reproducing information with respect to the second information recording medium.

The above configuration makes it possible to avoid, on a focus error signal, an influence of virtual diffracted order light which forms a virtual collecting point between a convergent point of normal diffracted order light and a collecting point of unwanted diffracted order light. This is advantageous in effectively implementing the focus servo function in applying an objective lens provided with a diffraction structure to an optical head.

An objective lens according to yet another aspect of the invention is an objective lens for converging laser light of a first wavelength $\lambda 1$, laser light of a second wavelength $\lambda 2$, and laser light of a third wavelength $\lambda 3$ on an information recording surface of a first information recording medium, an information recording surface of a second information recording medium, and an information recording surface of a third information recording medium, the first information recording medium, the second information recording medium, and the third information recording medium having protective substrate thicknesses different from each other, and the first wavelength $\lambda 1$, the second wavelength $\lambda 2$, and the third wavelength $\lambda 3$ being different from each other. At least one surface of the objective lens is provided with a diffraction structure having a step for giving an optical path length difference with respect to the laser light to be incident on the objective lens. The first wavelength $\lambda 1$ satisfies a condition: 390 [nm]$\leq \lambda 1 \leq$430 [nm]. The second wavelength $\lambda 2$ satisfies a condition: 630 [nm]$\leq \lambda 2 \leq$680 [nm]. The third wavelength $\lambda 3$ satisfies a condition: 750 [nm]$\leq \lambda 3 \leq$810 [nm]. The diffraction structure is configured to generate normal diffracted order light which is converged on the information recording surface of the third information recording medium, and unwanted diffracted order light which is collected at a position away from the information recording surface of the third information recording medium, from laser light of the third wavelength $\lambda 3$. The diffraction structure gives a lens effect such that a distance from a convergent point of the normal diffracted order light, to a virtual collecting point formed by virtual diffracted order light between the convergent point of the normal diffracted order light and a collecting point of the unwanted diffracted order light is twice or more of a pull-in range of a focus error signal to be obtained in recording or reproducing information with respect to the third information recording medium.

According to the above configuration, the objective lens is configured such that at least one surface of the objective lens is provided with a diffraction structure having a step for giving an optical path length difference with respect to incident laser light. The first wavelength $\lambda 1$ satisfies a condition: 390 [nm]$\leq \lambda 1 \leq$430 [nm]. The second wavelength $\lambda 2$ satisfies a condition: 630 [nm]$\leq \lambda 2 \leq$680 [nm]. The third wavelength $\lambda 3$ satisfies a condition: 750 [nm]$\leq \lambda 3 \leq$810 [nm]. The diffraction structure is configured to generate normal diffracted order light which is converged on the information recording surface of the third information recording medium, and unwanted diffracted order light which is collected at a position away from the information recording surface of the third information recording medium, from laser light of the third wavelength $\lambda 3$. The diffraction structure gives a lens effect such that a distance from a convergent point of normal diffracted order light, to a virtual collecting point formed by virtual diffracted order light between the convergent point of normal diffracted order light and a collecting point of unwanted diffracted order light is twice or more of a pull-in range of a focus error signal to be obtained in recording or reproducing information with respect to the third information recording medium.

The above configuration makes it possible to avoid, on a focus error signal, an influence of virtual diffracted order light which forms a virtual collecting point between a convergent point of normal diffracted order light and a collecting point of unwanted diffracted order light. This is advantageous in effectively implementing the focus servo function in applying an objective lens provided with a diffraction structure to an optical head.

An optical disc device according to yet another aspect of the invention is provided with the optical head having one of the aforementioned configurations, a motor configured to drive and rotate an information recording medium, and a controller configured to control the optical head and the motor. According to the above configuration, it is possible to apply the optical head device to an optical disc device.

A computer according to yet another aspect of the invention is provided with the optical disc device, an input unit configured to input information, an arithmetic unit configured to compute based on information reproduced from the optical disc device and/or information input from the input unit, and an output unit configured to output the information reproduced from the optical disc device, the information input from the input unit, and/or a result of computation by the arithmetic unit. According to the above configuration, it is possible to apply the optical disc device provided with the optical head device to a computer.

An optical disc player according to yet another aspect of the invention is provided with the optical disc device, and a decoder configured to convert an information signal to be obtained from the optical disc device into image information. According to the above configuration, it is possible to apply the optical disc device provided with the optical head device to an optical disc player.

An optical disc recorder according to still another aspect of the invention is provided with the optical disc device, and an encoder configured to convert image information into an information signal to be recorded by the optical disc device. According to the above configuration, it is possible to apply the optical disc device provided with the optical head device to an optical disc recorder.

The embodiments or the examples described in the section of description of embodiments are provided to clarify the technical contents of the invention. The invention should not be construed to be limited to the embodiments or the examples. The invention may be modified in various ways as far as such modifications do not depart from the spirit and the scope of the invention hereinafter defined.

Industrial Applicability

An optical head of the invention is capable of effectively implementing the focus servo function in applying an objective lens provided with a diffraction structure to the optical head, and is useful as a optical head for recording or reproducing information with respect to information recording surfaces of a first information recording medium, a second information recording medium, and a third information recording medium, whose protective substrate thicknesses differ from each other.

Further, an objective lens for use in the optical head, an optical disc device provided with the optical head, a computer provided with the optical disc device, an optical disc player provided with the optical disc device, and an optical disc recorder provided with the optical disc device are capable of desirably recording or reproducing information on or from BD, DVD or CD, and are applicable in a wide range.

The invention claimed is:

1. An optical head for recording or reproducing information with respect to an information recording surface of a first information recording medium, an information recording surface of a second information recording medium, and an information recording surface of a third information recording medium, the first information recording medium, the second information recording medium, and the third information recording medium having protective substrate thicknesses different from each other, the optical head comprising:

a light source configured to output laser light of a first wavelength $\lambda 1$, laser light of a second wavelength $\lambda 2$, and laser light of a third wavelength $\lambda 3$, the first wavelength $\lambda 1$, the second wavelength $\lambda 2$, and the third wavelength $\lambda 3$ being different from each other; and an objective lens configured to converge the laser light of the first wavelength $\lambda 1$, the laser light of the second wavelength $\lambda 2$, and the laser light of the third wavelength $\lambda 3$ on the information recording surface of the first information recording medium, the information recording surface of the second information recording medium, and the information recording surface of the third information recording medium, wherein the first wavelength $\lambda 1$ satisfies a condition: 390 [nm] $\leq \lambda 1 \leq 430$ [nm], the second wavelength $\lambda 2$ satisfies a condition: 630 [nm] $\leq \lambda 2 \leq 680$ [nm], the third wavelength $\lambda 3$ satisfies a condition: 750 [nm] $\leq \lambda 3 \leq 810$ [nm], at least one surface of the objective lens is provided with a diffraction structure having a step for giving an optical path length difference with respect to the laser light to be incident on the objective lens, the diffraction structure is configured to generate normal diffracted order light which is converged on the information recording surface of the third information recording medium, and unwanted diffracted order light which is collected at a position away from the information recording surface of the third information recording medium, from laser light of the third wavelength $\lambda 3$ transmitted through the objective lens, and a distance from a convergent point of the normal diffracted order light, to a virtual collecting point formed by virtual diffracted order light between the convergent point of the normal diffracted order light and a collecting point of the unwanted diffracted order light is twice or more of a pull-in range of a focus error signal to be obtained in recording or reproducing information with respect to the third information recording medium, a third focus error signal to be detected based on the virtual diffracted order light is generated between a first focus error signal to be detected based on the normal diffracted order light and a second focus error signal to be detected based on the unwanted diffracted order light, the diffraction structure forms a plurality of virtual collecting points respectively formed by a plurality of virtual diffracted order lights between the convergent point of the normal diffracted order light and the collecting point of the unwanted diffracted order light, the third focus error signal includes a plurality of third focus error signals to be detected based on the virtual diffracted order light, and a distance between a zero-cross point of the third focus error signal closest to the first focus error signal, out of the plurality of the third focus error signals, and a zero-cross point of the first focus error signal is twice or more of the pull-in range of the first focus error signal to be obtained in recording or reproducing information with respect to the third information recording medium.

2. The optical head according to claim 1, wherein an amplitude of at least one of the third focus error signals is larger than an amplitude of the second focus error signal.

3. The optical head according to claim 1, wherein a distance between a zero-cross point of the third focus error signal having a larger amplitude than an amplitude of the second focus error signal, out of the plurality of the third focus error signals, to the zero-cross point of the first focus error signal is twice or more of the pull-in range of the first focus error signal to be obtained in recording or reproducing information with respect to the third information recording medium.

4. An optical head for recording or reproducing information with respect to an information recording surface of a first information recording medium and an information recording surface of a second information recording medium, the first information recording medium and the second information recording medium having protective substrate thicknesses different from each other, the optical head comprising:

a light source configured to output laser light of a first wavelength $\lambda 1$ and laser light of a second wavelength $\lambda 2$, the first wavelength $\lambda 1$ and the second wavelength $\lambda 2$ being different from each other; and an objective lens configured to converge the laser light of the first wavelength $\lambda 1$ and the laser light of the second wavelength $\lambda 2$ on the information recording surface of the first information recording medium and the information recording surface of the second information recording medium, wherein the first wavelength $\lambda 1$ satisfies a condition: 390 [nm]≤ $\lambda 1$≤430 [nm], the second wavelength $\lambda 2$ satisfies a condition: 630 [nm]≤ $\lambda 2$≤680 [nm], at least one surface of the objective lens is provided with a diffraction structure having a step for giving an optical path length difference with respect to the laser light to be incident on the objective lens, the diffraction structure is configured to generate normal diffracted order light which is converged on the information recording surface of the second information recording medium, and unwanted diffracted order light which is collected at a position away from the information recording surface of the second information recording medium, from laser light of the second wavelength $\lambda 2$ transmitted through the objective lens, and a distance from a convergent point of the normal diffracted order light, to a virtual collecting point formed by virtual diffracted order light between the convergent point of the normal diffracted order light and a collecting point of the unwanted diffracted order light is twice or more of a pull-in range of a focus error signal to be obtained in recording or reproducing information with respect to the second information recording medium, a third focus error signal to be detected based on the virtual diffracted order light is generated between a first focus error signal to be detected based on the normal diffracted order light and a second focus error signal to be detected based on the unwanted diffracted order light, the diffraction structure forms a plurality of virtual collecting points respectively formed by a plurality of virtual diffracted order lights between the convergent point of the normal diffracted order light and the collecting point of the unwanted diffracted order light, the third focus error signal includes a plurality of third focus error signals to be detected based on the virtual diffracted order light, and a distance between a zero-cross point of the third focus error signal closest to the first focus error signal, out of the plurality of the third focus error signals, and a zero-cross point of the first focus error signal is twice or more of the pull-in range of the first focus error signal to be obtained in recording or reproducing information with respect to the third information recording medium.

5. An objective lens for converging laser light of a first wavelength $\lambda 1$, laser light of a second wavelength $\lambda 2$, and laser light of a third wavelength $\lambda 3$ on an information recording surface of a first information recording medium, an information recording surface of a second information recording medium, and an information recording surface of a third information recording medium, the first information recording medium, the second information recording medium, and the third information recording medium having protective substrate thicknesses different from each other, and the first wavelength $\lambda 1$, the second wavelength $\lambda 2$, and the third wavelength $\lambda 3$ being different from each other, wherein at least one surface of the objective lens is provided with a diffraction structure having a step for giving an optical path length difference with respect to the laser light to be incident on the objective lens, the first wavelength $\lambda 1$ satisfies a condition: 390 [nm]≤ $\lambda 1$≤430 [nm], the second wavelength $\lambda 2$ satisfies a condition: 630 [nm]≤ $\lambda 2$≤680 [nm], the third wavelength $\lambda 3$ satisfies a condition: 750 [nm]≤ $\lambda 3$≤810 [nm], the diffraction structure is configured to generate normal diffracted order light which is converged on the information recording surface of the third information recording medium, and unwanted diffracted order light which is collected at a position away from the information recording surface of the third information recording medium, from laser light of the third wavelength $\lambda 3$, and the diffraction structure gives a lens effect such that a distance from a convergent point of the normal diffracted order light, to a virtual collecting point formed by virtual diffracted order light between the convergent point of the normal diffracted order light and a collecting point of the unwanted diffracted order light is twice or more of a pull-in range of a focus error signal to be obtained in recording or reproducing information with respect to the third information recording medium, a third focus error signal to be detected based on the virtual diffracted order light is generated between a first focus error signal to be detected based on the normal diffracted order light and a second focus error signal to be detected based on the unwanted diffracted order light, the diffraction structure forms a plurality of virtual collecting points respectively formed by a plurality of virtual diffracted order lights between the convergent point of the normal diffracted order light and the collecting point of the unwanted diffracted order light, the third focus error signal includes a plurality of third focus error signals to be detected based on the virtual diffracted order light, and the diffraction structure gives a lens effect such that a distance between a zero-cross point of the third focus error signal closest to the first focus error signal, out of the plurality of third focus error signals, and a zero-cross point of the first focus error signal is twice or more of the pull-in range of the first focus error signal to be obtained in recording or reproducing information with respect to the third information recording medium.

6. An optical disc device comprising:

the optical head of claim 1;

a motor configured to drive and rotate an information recording medium; and a controller configured to control the optical head and the motor.

7. A computer comprising:

the optical disc device of claim 6;

an input unit configured to input information;

an arithmetic unit configured to compute based on information reproduced from the optical disc device and/or information input from the input unit; and an output unit configured to output the information reproduced from the optical disc device, the information input from the input unit, and/or a result of computation by the arithmetic unit.

8. An optical disc player comprising:

the optical disc device of claim 6; and a decoder configured to convert an information signal to be obtained from the optical disc device into image information.

9. An optical disc recorder comprising:

the optical disc device of claim 6; and an encoder configured to convert image information into an information signal to be recorded by the optical disc device.

* * * * *